(12) United States Patent
Watanabe

(10) Patent No.: US 10,009,769 B2
(45) Date of Patent: *Jun. 26, 2018

(54) INFORMATION PROCESSING APPARATUS, INFORMATION PROCESSING SYSTEM, METHOD FOR AUTHENTICATION, AND MEDIUM

(71) Applicant: Ricoh Company, Ltd., Tokyo (JP)

(72) Inventor: Genki Watanabe, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 31 days.

This patent is subject to a terminal disclaimer.

(21) Appl. No.: 15/391,057

(22) Filed: Dec. 27, 2016

(65) Prior Publication Data

US 2017/0272946 A1    Sep. 21, 2017

(30) Foreign Application Priority Data

Mar. 15, 2016 (JP) ................................ 2016-050597

(51) Int. Cl.
*H04L 29/06* (2006.01)
*H04W 12/06* (2009.01)
*H04W 4/80* (2018.01)
*G06F 21/60* (2013.01)

(52) U.S. Cl.
CPC .......... *H04W 12/06* (2013.01); *G06F 21/608* (2013.01); *H04L 63/0492* (2013.01); *H04L 63/0853* (2013.01); *H04W 4/80* (2018.02)

(58) Field of Classification Search
CPC ......... H04W 12/06; H04W 4/80; G06F 1/608; H04L 63/0492; H04L 63/0853
See application file for complete search history.

(56) References Cited

U.S. PATENT DOCUMENTS

| | | | |
|---|---|---|---|
| 9,417,824 | B2 | 8/2016 | Watanabe |
| 2014/0149894 | A1 | 5/2014 | Watanabe et al. |
| 2015/0043790 | A1 | 2/2015 | Ono et al. |
| 2015/0338898 | A1 | 11/2015 | Yoshida et al. |
| 2015/0358491 | A1 | 12/2015 | Watanabe et al. |

FOREIGN PATENT DOCUMENTS

| | | |
|---|---|---|
| JP | 2008-004050 | 1/2008 |
| JP | 2015-035178 | 2/2015 |

*Primary Examiner* — Ghodrat Jamshidi
(74) *Attorney, Agent, or Firm* — IPUSA, PLLC

(57) ABSTRACT

An information processing apparatus to authenticate a user, by using a wireless device to obtain predetermined information from a wireless terminal carried by the user, and an imaging device to capture an image of the user, includes a unit to detect an approach of a person; a unit to activate the wireless device and the imaging device upon the approach detected; a unit to transmit a radio wave for having the wireless terminal transmit the predetermined information when the wireless device has been activated; a unit to wirelessly authenticate the user, based on the predetermined information; a unit to authenticate of the user by the captured image of the user; and a unit to permit the user to use the information processing apparatus if the user permitted by the wireless authentication is the same as the user permitted by the image authentication.

14 Claims, 18 Drawing Sheets

FIG.7

| DATA TYPE | DATA 1 | DATA 2 | ... | DATA 300 |
|---|---|---|---|---|
| USER NUMBER | 101001 | 101002 | ... | 101300 |
| NAME | AAAA | BBBB | ... | XXXX |
| MAIL ADDRESS | aaa@bbb.ccc | bbb@bbb.ccc | ... | xxx@bbb.ccc |
| LOGIN ID | AA_AA | BB_BB | ... | XX_XX |
| LOGIN PASSWORD | 12345 | abcdef | ... | xxxxx |
| WIRELESS TAG ID | 00522213 | 00535213 | ... | 05245219 |
| CHARACTERISTIC INFORMATION OF USER | {222, 241, 52, ..., 40, −167, −58} | {56, 111, −3, ..., −120, 47, 208} | ... | {186, 241, −36, ..., 20, −67, 158} |
| ... | ... | ... | ... | ... |

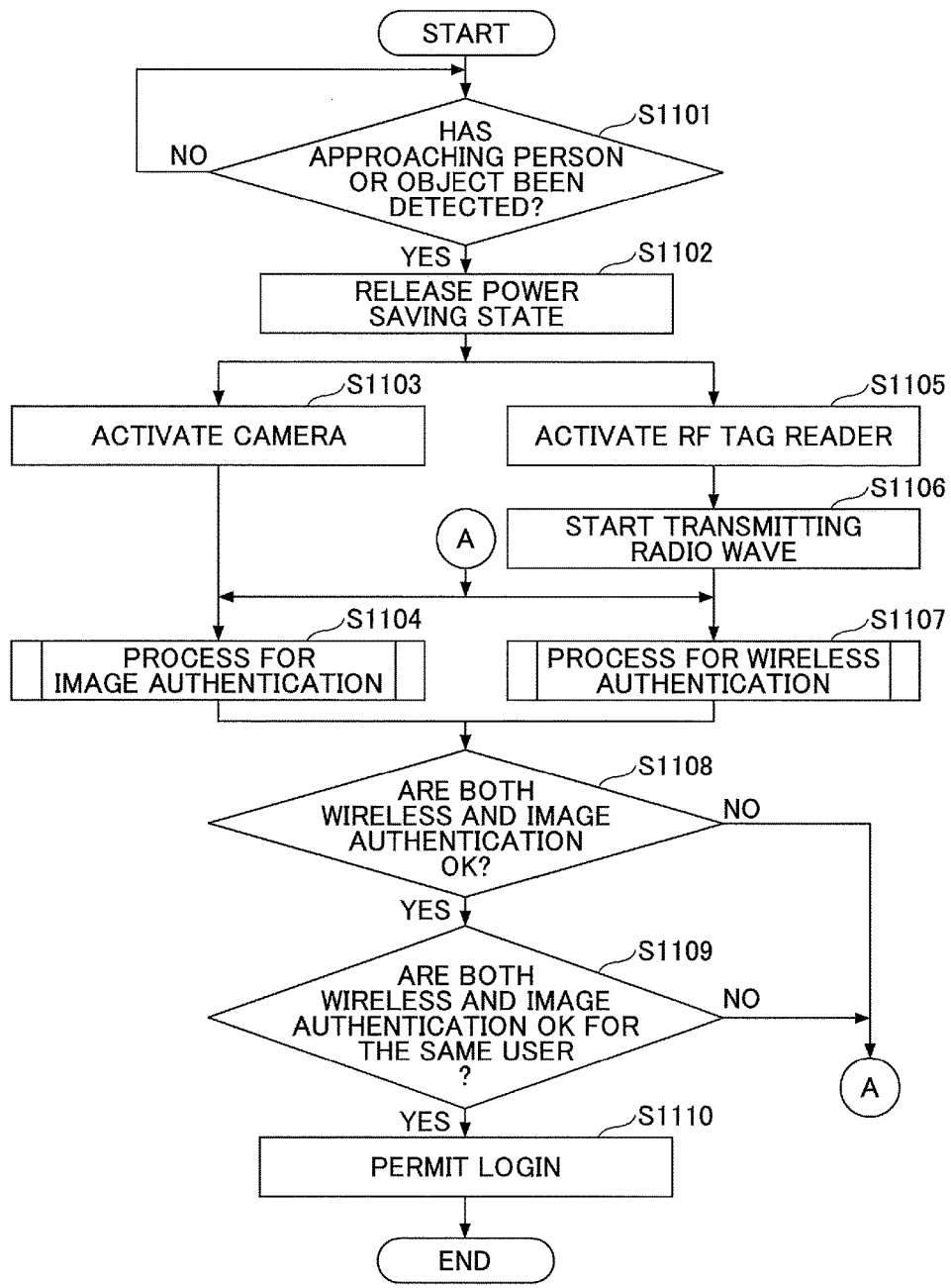

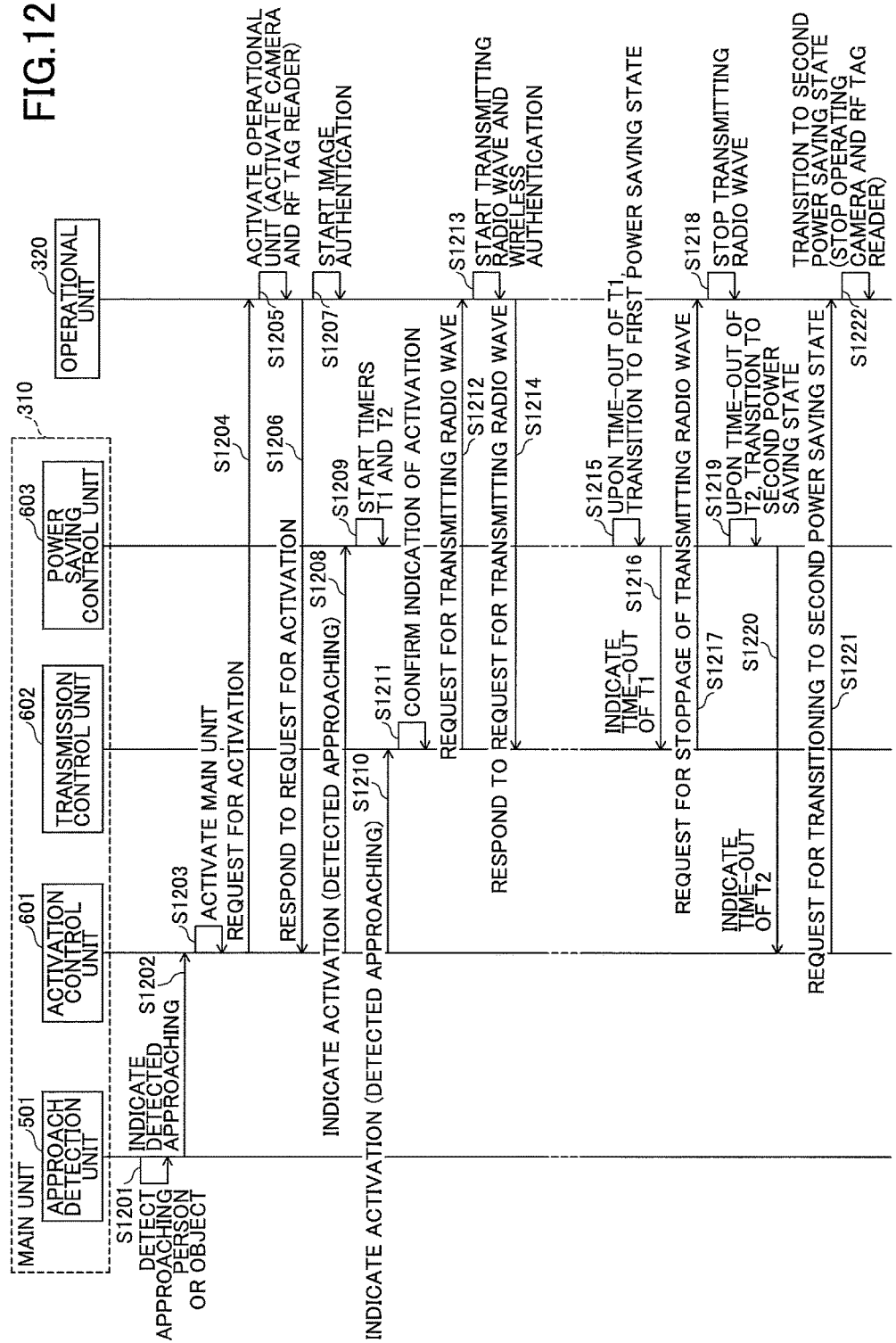

INFORMATION PROCESSING APPARATUS, INFORMATION PROCESSING SYSTEM, METHOD FOR AUTHENTICATION, AND MEDIUM

BACKGROUND OF THE INVENTION

1. Field of the Invention

The present disclosure relates to an information processing apparatus, information processing system, a method for authentication, and a medium.

2. Description of the Related Art

In recent years, as methods for authenticating users, image authentication technologies such as face authentication, which do not require an operation such as inputting a password or the like, and can prevent identity fraud caused by loss or theft of an IC card, and the like, have become popular.

Also, an image processing apparatus has been known that compares and verifies information generated from a face image obtained by capturing an area that includes the face of a user, with authentication information registered in advance, to authenticate the user (see, for example, Patent Document 1).

However, image authentication that uses a captured image, for example, face authentication, has a problem in that precision of authentication is lower compared to popular methods for authentication that use IC cards or the like, and hence, it is difficult to obtain sufficient precision of authentication.

To cope with such a problem, one may consider, for example, combining image authentication and wireless authentication using a wireless tag such as an IC card to improve precision of the image authentication, but the power consumption increases for transmitting radio waves to the wireless tag.

To reduce the power consumption, one may also consider, for example, activating each authentication device in response to an operation by the user, but in this case, another problem arises in that it takes a longer time after the user has started the use until the authentication of the user completes.

SUMMARY OF THE INVENTION

According to an embodiment, an information processing apparatus configured to authenticate a user, by using a wireless device configured to obtain predetermined information from a wireless terminal carried by the user, and an imaging device configured to capture an image of the user, includes an approach detection unit configured to detect an approach of a person or an object; an activation control unit configured to activate the wireless device and the imaging device in response to detection of the approach by the approach detection unit; a transmission control unit configured to transmit a radio wave for having the wireless terminal transmit the predetermined information when the wireless device has been activated in response to the detection of the approach by the approach detection unit; a wireless authentication unit configured to execute wireless authentication of the user, based on the predetermined information obtained by the wireless device from the wireless terminal; an image authentication unit configured to execute image authentication of the user, based on the image of the user captured by the imaging device; and a device authentication unit configured to permit the user to use the information processing apparatus in a case where the user permitted by the wireless authentication is the same user as the user permitted by the image authentication.

BRIEF DESCRIPTION OF DRAWINGS

FIG. 7 is a table illustrating an example of user information according to an embodiment;

FIG. 11 is a flowchart illustrating an example of a process for device authentication according to the first embodiment;

FIG. 12 is a sequence chart illustrating an example of a process for controlling the power state according to the first embodiment;

DETAILED DESCRIPTION OF THE EMBODIMENTS

In the following, embodiments will be described with reference to the drawings. According to an embodiment in the present disclosure, an information processing apparatus that authenticates a user by using image authentication and wireless authentication can shorten the time required for authentication on the apparatus while preventing increase of the power consumption of the apparatus.

<Configuration of System>

Figure 1:
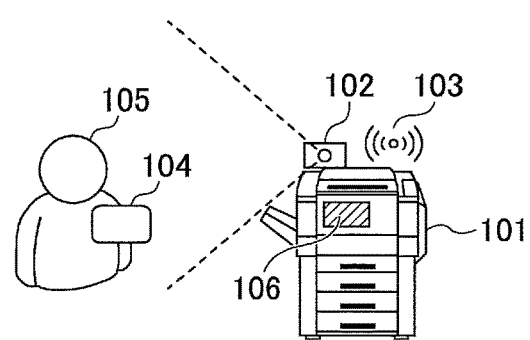
FIG. 1 is a diagram illustrating an example of a configuration of an information processing system according to an embodiment.

FIG. 1 is a diagram illustrating an example of a configuration of an information processing system according to an embodiment. In FIG. 1, an information processing system 100 includes an image forming apparatus 101 and a radio-frequency identification (RFID) tag 104 held by a user 105.

The image forming apparatus 101 is an example of an information processing apparatus according to the embodiment, for example, a multifunction peripheral (MFP) including functions of a printer, a scanner, a copier, and a facsimile machine, or an image forming apparatus such as a printer.

The image forming apparatus 101 includes an RF tag reader 103, a camera 102, and a mobile object sensor 106.

The RF tag reader 103 is a wireless device that obtains predetermined information such as a tag ID from the RFID tag 104 located within the detection range.

RFID is a technology for executing near field communication between the RFID tag 104 storing predetermined information such as the tag ID, and the RF tag reader 103, by using an electromagnetic field or a radio wave, which is an example of near field communication.

If the RFID tag 104 is, for example, a passive tag, the RF tag reader 103 emits a predetermined radio wave in a detection range of the RF tag reader 103. In response to receiving the radio wave emitted from the RF tag reader 103, the RFID tag 104 operates on the received radio wave as the power source, to transmit predetermined information such as the tag ID stored in advance to the RF tag reader 103.

A passive tag operates on a radio wave from the RF tag reader 103 as the energy source, does not need to have a battery built in, and the RFID tag 104 is a passive tag. The antenna of a passive tag reflects a part of the radio wave from the RF tag reader 103, and information such as the tag ID is returned by this reflected wave. Since the strength of this reflection is very small, a passive tag covers a shorter communication distance than an active tag that transmits a radio wave by the power of the device of its own, but has a lower cost, and operates virtually permanently.

It is assumed in the embodiment that the RFID tag 104 is a passive tag in the following description. However, the RFID tag 104 is an example of a wireless terminal that transmits predetermined information to the image forming apparatus 101 in response to a predetermined radio wave transmitted from the image forming apparatus 101, and may be a wireless terminal other than a passive tag.

The camera 102 is an imaging device that is installed so that an image captured by the camera 102 contains, for example, a user who uses the image forming apparatus 101.

The mobile object sensor 106 is a sensor that detects a mobile object within the detection range around the image forming apparatus 101, to detect approach of a mobile object to the image forming apparatus 101.

(Detection Ranges of Devices)

Figure 2:
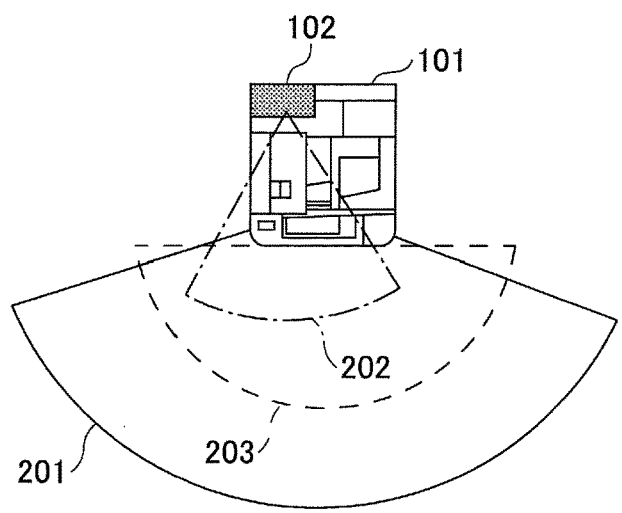
FIG. 2 is a diagram illustrating an example of detection ranges of devices according to an embodiment.

FIG. 2 is a diagram illustrating an example of detection ranges of devices according to an embodiment. FIG. 2 illustrates a detection range 201 of the mobile object sensor 106, a detection range (capturing range) 202 of the camera 102, and a detection range 203 of the RF tag reader 103, viewed from the upper side of the image forming apparatus 101.

The detection range 201 of the mobile object sensor 106 is formed to have a fanning shape with the radius, for example, about 2 m in front of the image forming apparatus 101 (in the downward direction in FIG. 2). In the embodiment, the detection range 201 of the mobile object sensor 106 is set larger than the detection range 202 of the camera 102 and the detection range 203 of the RF tag reader 103.

The detection range 202 of the camera 102 is a range within which the camera 102 can capture an image required for image authentication, and is formed to have a fanning shape with the radius, for example, about 0.6 m in front of the image forming apparatus 101.

The RF tag reader 103 includes an antenna such as a patch antenna in the image forming apparatus 101, whose detection range 203 is formed to have a fanning shape with the radius, for example, about 1 m in front of the image forming apparatus 101.

Thus, for example, if the user 105 carrying the RFID tag 104 approaches the image forming apparatus 101 on the front side, and comes within a predetermined distance (for example, 1 m), the predetermined information (for example, the tag ID) stored in the RFID tag 104 is automatically transmitted to the image forming apparatus 101.

In the embodiment, the image forming apparatus 101 stores information about users registered in advance, to execute wireless authentication of the user carrying the RFID tag 104, based on the tag ID received from the RFID tag 104 and the information about the users registered in advance.

Also, the image forming apparatus 101 executes image authentication of a user captured in the image, based on, for example, characteristic information about the face of the user extracted from the captured image of the user included in the image captured by the camera 102, and characteristic information about faces of the users registered in advance.

Further, if permissions are obtained by the wireless authentication and the image authentication, respectively, the image forming apparatus 101 executes login authentication (device authentication) based on information about the user who has been permitted by the wireless authentication, and information about the user who has been permitted by the image authentication. If the user who has been permitted by the wireless authentication is, for example, the same user as the user who has been permitted by the image authentication, the image forming apparatus 101 permits the user to use the image forming apparatus 101.

(Power State of Image Forming Apparatus)

The image forming apparatus 101 has a power saving function, and takes multiple power states, for example, a normal state, a first power saving state, and a second power saving state.

In the normal state, power is supplied to units of the image forming apparatus 101, and it is possible to execute normal processes including a process for wireless authentication, a process for image authentication, a process for device authentication, and a process for image forming.

In the first power saving state, power consumption is less than in the normal state, and execution is limited for a part of processes among the processes of the image forming apparatus 101, but it is possible to return to the normal state in a short time.

In the second power saving state, power consumption is further less than in the first power saving state. In the second power saving state, power supply to the units of the image forming apparatus 101 is limited, and only a part of functions such as the mobile object sensor 106 is in operation.

For example, if a mobile object is detected by the mobile object sensor 106 in the second power saving state, the image forming apparatus 101, the image forming apparatus 101 returns to, for example, the normal state, and starts authentication processes of image authentication, wireless authentication, and device authentication.

Thus, by the information processing system 100 according to the embodiment, it is possible to shorten the time required for authentication by the image forming apparatus 101 that authenticates a user by using image authentication and wireless authentication, while preventing increase of the power consumption of the apparatus.

Note that the image forming apparatus 101 is an example of an information processing apparatus that authenticates a user. The image forming apparatus 101 may be, for example, a PC (Personal Computer), a tablet terminal, a smart phone, a game machine, a video-conference apparatus, or any other one of various information processing apparatuses that authenticates a user. Also, the camera 102 and the RF tag reader 103 may be devices that are attached to the image forming apparatus 101 externally, or may be included in the operational unit of the image forming apparatus 101.

Also, face authentication is an example of image authentication which may adopt any one of various image authentication techniques that authenticate a user based on predetermined characteristic information extracted from a face image of the user, and predetermined characteristic information of preregistered users. For example, the image authentication may extract characteristic information by using a part of the face image of the user (for example, an iris, etc.), to authenticate the user by the similarity of the information.

<Hardware Configuration>

(Hardware Configuration of Image Forming Apparatus)

Figure 3:
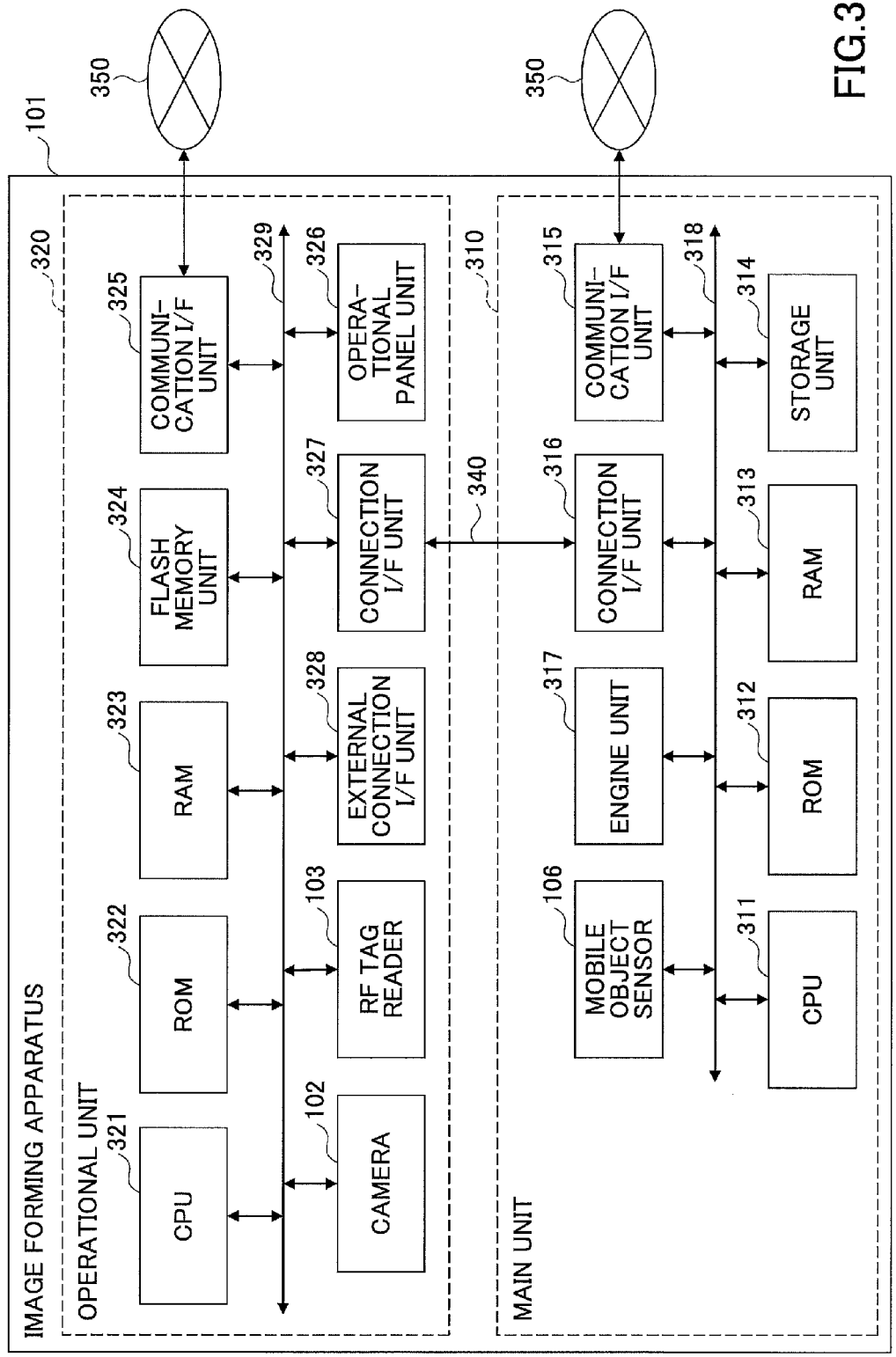
FIG. 3 is a diagram illustrating an example of a hardware configuration of an image forming apparatus according to an embodiment.

FIG. 3 is a diagram illustrating an example of a hardware configuration of the image forming apparatus 101 according to an embodiment. The image forming apparatus 101 includes a main unit 310 that implements various image forming functions, for example, a copy function, a scanner function, a fax function, and a printer function; and an operational unit 320 that receives a user operation. Note that the meaning of "receiving a user operation" here includes receiving information input along with the user operation (including a signal that represents coordinate values on a screen). The main unit 310 and the operational unit 320 are connected to communicate with each other via a dedicated communication path 340. The communication path 340 may be compliant with, for example, USB (Universal Serial Bus) standards, or any other standards regardless of wired or wireless.

Note that the main unit 310 can execute an operation that corresponds to an operation received by the operational unit 320. Also, the main unit 310 can communicate with an external apparatus such as a client PC, and can execute an operation that corresponds to an operation received from the external apparatus.

(Main Body)

First, a hardware configuration of the main unit 310 will be described. As illustrated in FIG. 3, the main unit 310 includes a central processing unit (CPU) 311, a read-only memory (ROM) 312, a random access memory (RAM) 313, a storage unit 314, a communication interface (I/F) unit 315, a connection I/F unit 316, an engine unit 317, the mobile object sensor 106, and a system bus 318.

The CPU 311 controls operations of the main unit 310 as a whole. The CPU 311 executes programs stored in the ROM 312 or the storage unit 314 by using the RAM 313 as a work area, to control operations of the main unit 310 as a whole. The CPU 311 implements various functions, for example, the copy function, the scanner function, the fax function, and the printer function described above.

The ROM 312 is a non-volatile memory that stores, for example, a basic input/output system (BIOS) that is executed when the main unit 310 is activated, various settings, and the like. The RAM 313 is a volatile memory that is used as a work area of the CPU 311. The storage unit 314 is a non-volatile storage device that stores, for example, an operating system (OS), application programs, various data items, and the like, and may be constituted with, for example, a hard disk drive (HDD), a solid state drive (SSD), and the like.

The communication I/F unit 315 is a network interface for connecting the main unit 310 to a network 350, and for communicating with an external apparatus that is connected with the network 350. The connection I/F unit 316 is an interface to communicate with the operational unit 320 via the communication path 340.

The engine unit 317 is hardware that executes general-purpose information processing to implement the functions of the copy function, the scanner function, the fax function, the printer function, and the like, and processing other than communication. The engine unit 317 includes, for example, a scanner (an image scanning unit) that scans and captures an image of a document, a plotter (an image forming unit) that executes printing on a sheet member such as paper, and a fax unit that executes fax communication. The engine unit 317 may further include specific optional units such as a finisher that sorts out printed sheet members, and an automatic document feeder (ADF) that feeds document sheets automatically.

The mobile object sensor 106 corresponding to the mobile object sensor 106 illustrated in FIG. 1 detects a mobile object located within the detection range around the image forming apparatus 101. As the mobile object sensor 106, for example, a pyroelectricity sensor or a thermopile sensor may be used.

A pyroelectricity sensor is an infrared sensor that detects a temperature change by the pyroelectricity effect, to detect a human body or the like. Also, a thermopile sensor is an infrared sensor that generates, when receiving infrared rays radiated from an object, a thermoelectromotive force, depending on the amount of energy incident on the sensor.

Note that the mobile object sensor 106 may be externally attached, for example, on the outside of the image forming apparatus 101.

The system bus 318 is connected with the above elements, to transmit an address signal, a data signal, various control signals, and the like.

(Operational Unit)

Next, a hardware configuration of the operational unit 320 will be described. As illustrated in FIG. 3, the operational unit 320 includes a CPU 321, a ROM 322, a RAM 323, a flash memory unit 324, a communication I/F unit 325, an operational panel unit 326, a connection I/F unit 327, an external connection I/F unit 328, the RF tag reader 103, the camera 102, and a system bus 329.

The CPU 321 controls operations of the operational unit 320 as a whole. The CPU 321 executes programs stored in the ROM 322 or the storage unit 324 by using the RAM 323 as a work area, to control operations of the operational unit 320 as a whole. The CPU 321 implements various functions, for example, displaying information (an image) depending on input received from the user.

The ROM 322 is a non-volatile memory that stores, for example, a basic input/output system (BIOS) that is executed when the operational unit 320 is activated, various settings, and the like. The RAM 323 is a volatile memory that is used as a work area of the CPU 321. The flash memory unit 324 is a non-volatile storage device that stores, for example, an OS, application programs, various data items, and the like.

The communication I/F unit 325 is a network interface for connecting the operational unit 320 to the network 350, and for communicating with an external apparatus that is connected with the network 350.

The operational panel unit 326 receives various input items in response to user operations, and displays various information items (for example, information depending on a received operation, information that represents an operational state of the image forming apparatus 101, and setting states). The operational panel unit 326 may be constituted with, for example, a liquid crystal display (LCD) having a touch panel function installed, but is not limited to such constitution. The operational panel unit 326 may be constituted with, for example, an organic electro-luminescence (EL) display having a touch panel function installed. Further, in addition to or instead of the above constitution, the operational panel unit 326 may include an operational unit such as hardware keys, and a display part such as a lamp.

The connection I/F unit 327 is an interface of communicating with the main unit 310 via the communication path 340. The external connection I/F unit 328 is an interface for having an external apparatus connected, for example, USB.

The RF tag reader 103 corresponding to the RF tag reader 103 illustrated in FIG. 1, transmits a radio wave to have the RFID tag 104 transmit predetermined information (the tag ID or the like). Also, the RF tag reader 103 receives a radio wave replied from the RFID tag 104, and obtains predetermined information included in the received radio wave. Note that the RF tag reader 103 may be externally connected with the operational unit 320 by using, for example, the external connection I/F unit 328.

The camera 102 corresponding to the camera 102 illustrated in FIG. 1, captures an image in a predetermined range. Note that the camera 102 may be externally connected with the operational unit 320 by using, for example, the external connection I/F unit 328.

The system bus 329 is connected with the above elements, to transmit an address signal, a data signal, various control signals, and the like.

<Software Configuration>

Figure 4:
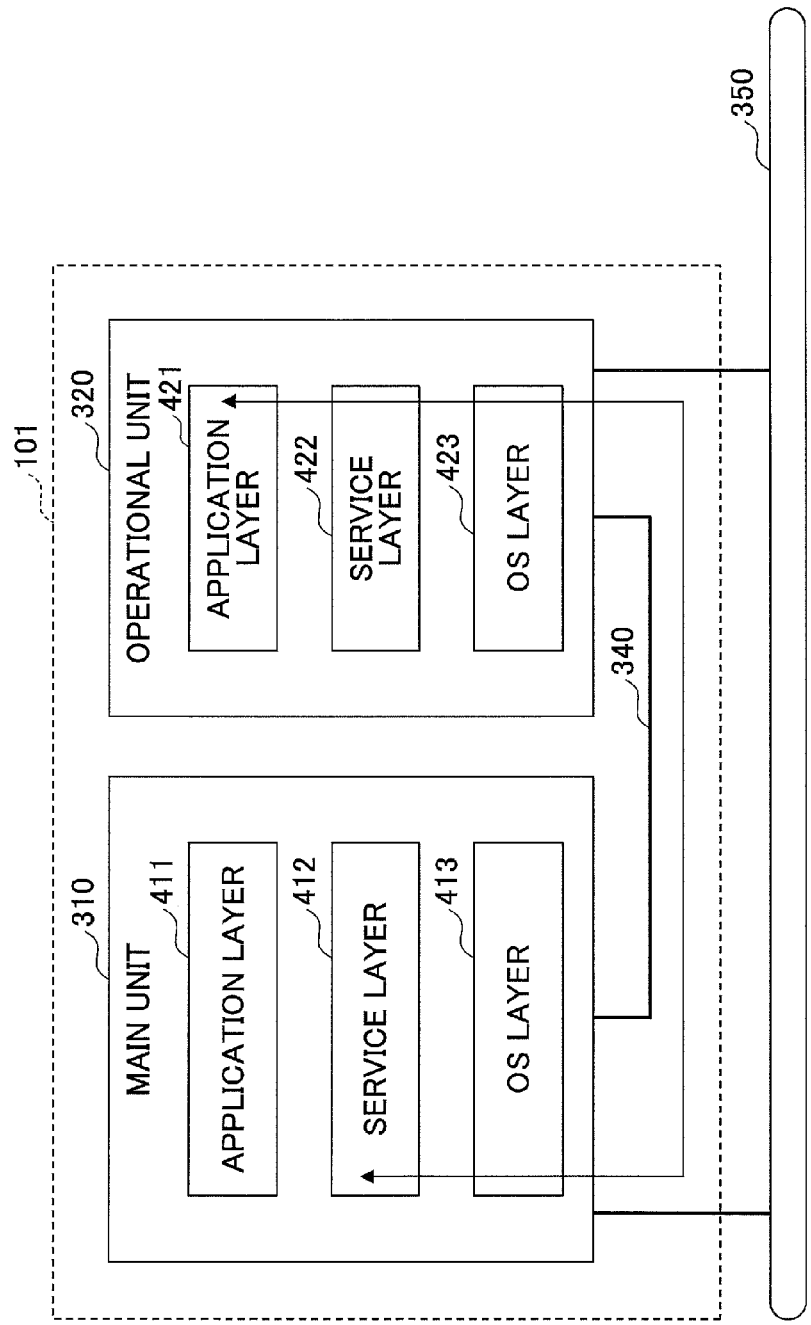
FIG. 4 is a diagram illustrating an example of a software configuration of an image forming apparatus according to an embodiment.

FIG. 4 is a diagram illustrating an example of a software configuration of the image forming apparatus 101 according to the embodiment.

As illustrated in FIG. 4, the main unit 310 includes an application layer 411, a service layer 412, and an OS layer 413. Entities corresponding to the application layer 411, the service layer 412, and the OS layer 413 are respective software items stored in the ROM 312 and the storage unit 314. The CPU 311 executes these software items (programs) to provide various functions of the main unit 310.

The application layer 411 includes software applications that provide predetermined functions by having hardware resources operate. Applications include, for example, a copy application that provides a copy function, a scanner application that provides a scanner function, a fax application that provides a fax function, and a printer application that provides a printer function.

The service layer 412 is software that lies between the application layer 411 and the OS layer 413, to provide an interface for applications in the application layer 411 to use hardware resources included in the main unit 310. More specifically, the service layer 412 is software that provides functions to receive requests for operation of hardware resources, and a function to arbitrate received requests for operation. As requests for operation to be received by the service layer 412, capturing by a scanner, printing by a plotter, and the like may be considered.

Note that the interface functions by the service layer 412 are provided not only for the application layer 411 of the main unit 310, but also for an application layer 421 of the operational unit 320. In other words, the application layer 421 of the operational unit 320 can implement a function that uses a hardware resource (for example, the engine unit 317) of the main unit 310 via the interface functions of the service layer 412 of the main unit 310.

The OS layer 413 is basic software (an operating system) that provides basic functions to control hardware included in the main unit 310. The service layer 412 converts requests for using hardware resources from various applications into commands that can be interpreted by the OS layer 413, and transfers the converted commands to the OS layer 413. Then, the OS layer 413 executes the commands to have the hardware resources operate following the requests of the applications.

Similarly, the operational unit 320 includes the application layer 421, a service layer 422, and an OS layer 423. The application layer 421, the service layer 422, and the OS layer 423 included in the operational unit 320 have substantially the same hierarchical structure as the corresponding layers included in the main unit 310. However, functions provided by applications in the application layer 421 and types of requests for operations that can be received by the service layer 422 are different from the functions and the types in the main unit 310. Although applications in the application layer 421 may be software that provides predetermined functions to have hardware resources included in the operational unit 320 operate, the applications mainly provide functions of user interface (UI) for operations about the functions included in the main unit 310, and for displaying. Also, the applications in the application layer 421 provide an authentication function that uses the RF tag reader 103, the camera 102, and the like included in the operational unit 320.

Note that in the embodiment, to make the functions independent, the software of the OS layer 413 on the side of the main unit 310 is different from the software of the OS layer 423 on the side of the operational unit 320. In other words, the main unit 310 and the operational unit 320 independently operate under different operating systems. For example, it is possible to use NetBSD (trademark) as the software of the OS layer 413 on the side of the main unit 310, and to use Android (trademark) as the software of the OS layer 423 on the side of the operational unit 320.

As described above, in the image forming apparatus 101 in the embodiment, since the main unit 310 and the operational unit 320 operate under different operating systems, communication between the main unit 310 and the operational unit 320 is not executed by inter-process communication, which is used for devices in a common apparatus, but executed by communication between different apparatuses. An operation to transfer information received by the operational unit 320 (contents of a command from a user) to the main unit 310 (command communication), an operation to indicate an event to the operational unit 320 by the main unit 310, and the like, correspond to such communication between different apparatuses. Here, the operational unit 320 may execute command communication to the main unit 310 to use a function of the main unit 310. Also, an event indicated to the operational unit 320 by the main unit 310 includes, for example, an execution state of an operation on the main unit 310, and contents set on the side of the main unit 310.

Also, in the embodiment, since power is supplied to the operational unit 320 from the main unit 310 via the communication path 340, power can be controlled for the operational unit 320, separately (independently) from power control of the main unit 310.

<Functional Configuration>

Figure 5:
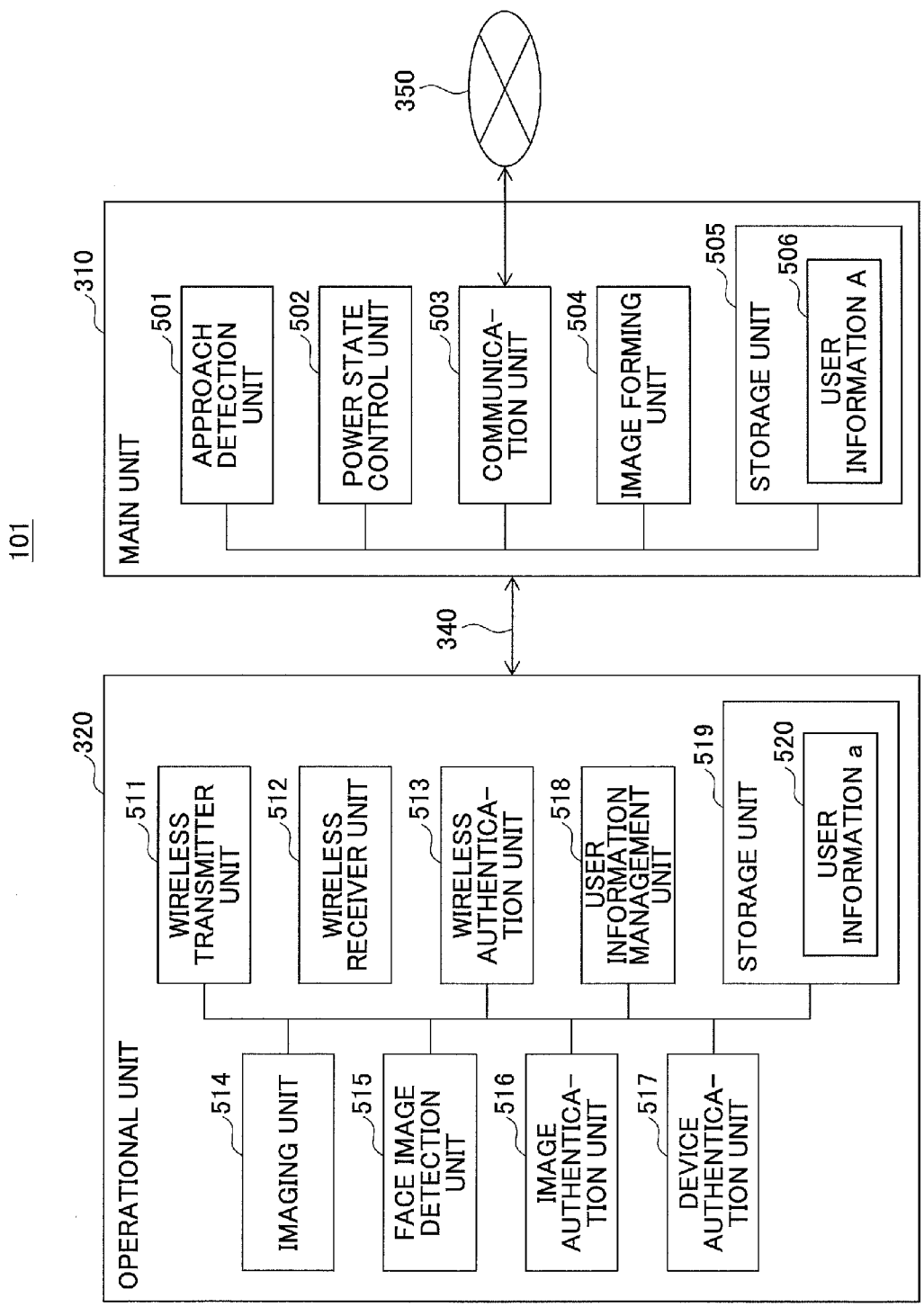
FIG. 5 is a functional configuration diagram of an image forming apparatus according to an embodiment.

FIG. 5 is a functional configuration of the image forming apparatus 101 according to a first embodiment.

(Functional Configuration of Main Unit)

The main unit 310 of the image forming apparatus 101 includes an approach detection unit 501, a power state control unit 502, a communication unit 503, an image forming unit 503, and a storage unit 504.

The approach detection unit 501 (approach detection unit) is a unit to detect approach of a person or an object to the image forming apparatus 101 by using, for example, the mobile object sensor 106, and is implemented by, for example, the mobile object sensor 106 and a program or the like that runs on the CPU 311 in FIG. 3.

Note that the approach detection unit 501 just needs to be capable of detecting approach of a user or an object (for example, a wireless terminal) carried by the user, to the image forming apparatus 101. For example, the approach detection unit 501 may detect approach of a person or an object, based on the strength or the like of a radio wave transmitted from an information terminal carried by the user 105 or a wireless terminal such as an active tag.

For example, if a mobile object is detected within the detection range 201 of the mobile object sensor 106, the approach detection unit 501 indicates that the approach has been detected to the power state control unit 502 and the like.

Figure 6:
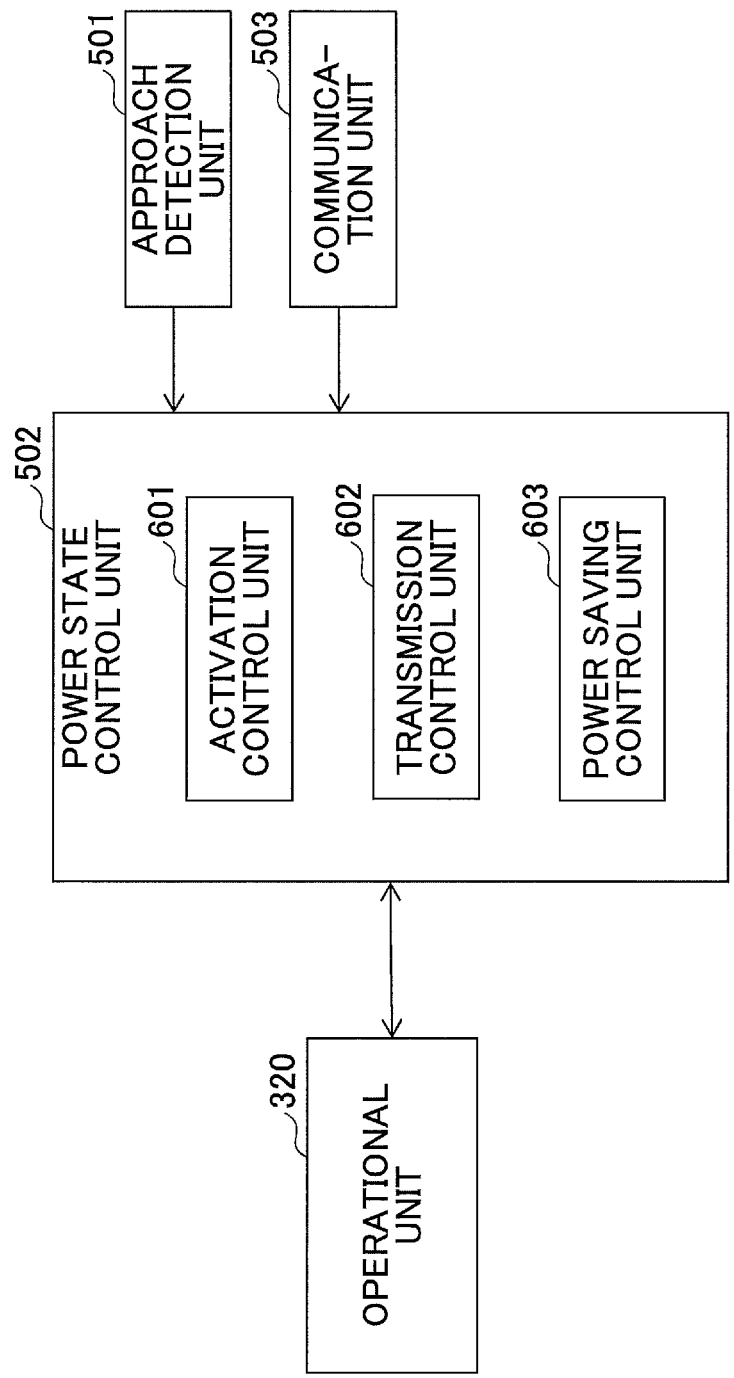
FIG. 6 is a diagram illustrating an example of a functional configuration of a power state control unit according to an embodiment.

The power state control unit 502 (a power state control unit) is a unit to control states of power of the units of the image forming apparatus 101, and is implemented by, for example, a program that runs on the CPU 311 (or the CPU 321) in FIG. 3. As illustrated in FIG. 6, the power state control unit 502 includes, for example, an activation control unit 601, a transmission control unit 602, and a power saving control unit 603.

FIG. 6 is a diagram illustrating an example of a functional configuration of the power state control unit 502 according to an embodiment.

When the image forming apparatus 101 is in a power saving state (for example, the second power saving state), the activation control unit 601 (an activation control unit) has the image forming apparatus 101 return to the normal state described above, in response to a predetermined event detected by the approach detection unit 501, the communication unit 503, the operational unit 320, and the like.

For example, if the approach detection unit 501 has detected approach of a person or an object, the activation control unit 601 releases the power saving state of the image forming apparatus 101 to return to the normal state.

Also, the activation control unit 601 executes, for example, control for activating the operational unit 320, and control for having the operational unit 320 transition to a power saving state.

The transmission control unit 602 (a transmission control unit) controls transmission and stoppage of a radio wave by the RF tag reader 103 to have the RFID tag 104 transmit predetermined information (the tag ID or the like).

For example, if the activation control unit 601 has the image forming apparatus 101 transition to the normal state in response to detection of approach by the approach detection unit 501, the transmission control unit 602 has the RF tag reader 103 start transmitting a radio wave. Also, for example, if the image forming apparatus 101 is to transition to the first power saving state, or if a user logs in the image forming apparatus 101, the transmission control unit 602 has the RF tag reader 103 stop transmitting the radio wave.

The power saving control unit 603 (a power saving control unit) has the image forming apparatus 101 transition to the first power saving state if the image forming apparatus 101 has not been used, for example, for a first time (T1) set in advance or longer. Further, the power saving control unit 603 has the image forming apparatus 101 transition to the second power saving state if the image forming apparatus 101 has not been used, for example, for a second time (T2) set in advance or longer.

Referring back to FIG. 5, the description will be continued about the functional configuration of the main unit 310 of the image forming apparatus 101.

The communication unit 503 (a communication unit) is a unit to communicate with an external apparatus (for example, information terminal, server apparatus, etc.) connected via the network 350, and is implemented by, for example, the communication I/F unit 315 (or the communication I/F unit 325) in FIG. 3.

The image forming unit 504 is a unit to execute various image forming functions (for example, printing, copying, scanning, and fax) included in the image forming apparatus 101, and is implemented by, for example, the engine unit 317 in FIG. 3 and a program run on the CPU 311 in FIG. 3.

The storage unit 505 is a unit to store information including user information 'A' 506, which is information about users of the image forming apparatus 101 registered in advance, and is implemented by, for example, the storage unit 314 and the RAM 313 in FIG. 3, and a program that runs on the CPU 311 in FIG. 3.

(Functional Configuration of Operation Unit)

The operational unit 320 of the image forming apparatus 101 includes a wireless transmitter unit 511, a wireless receiver unit 512, a wireless authentication unit 513, an imaging unit 514, a face image detection unit 515, an image authentication unit 516, a device authentication unit 517, a user information management unit 518, and a storage unit 519.

Following a request from the transmission control unit 602 described above, the wireless transmitter unit 511 transmits, by using the RF tag reader 103, a radio wave for having the RFID tag 104 transmit predetermined information (the tag ID or the like). For example, in response to receiving a request for transmitting a radio wave from the transmission control unit 602, the wireless transmitter unit 511 starts transmitting a radio wave by using the RF tag reader 103. Also, in response to receiving a request for stopping the transmission of the radio wave from the transmission control unit 602, the wireless transmitter unit 511 stops transmitting the radio wave by the RF tag reader 103. The wireless transmitter unit 511 is implemented by, for example, the RF tag reader 103 in FIG. 3 and a program or the like that runs on the CPU 321 in FIG. 3.

The wireless receiver unit 512 is a unit to receive predetermined information (the tag ID or the like) from the RFID tag 104 by using the RF tag reader 103, and is implemented by, for example, the RF tag reader 103 in FIG. 3, and a program or the like that runs on the CPU 321 in FIG. 3.

The wireless authentication unit 513 (a wireless authentication unit) executes wireless authentication to authenticate the user carrying the RFID tag 104 based on predetermined information received by the wireless receiver unit 512 and preregistered user information. The wireless authentication unit 513 is implemented by, for example, a program that runs on the CPU 321 (or the CPU 311) in FIG. 3.

For example, if the tag ID of the RFID tag 104 received by the wireless receiver unit 512 is included in the user information stored in advance, the wireless authentication unit 513 permits the wireless authentication of the user 105 carrying the RFID tag 104. Also, the wireless authentication unit 513 outputs (indicates) information for identifying the user permitted by the wireless authentication to the device authentication unit 517 and the like.

The imaging unit 514 (an imaging unit) is a unit to capture an image of a user by using the camera 102, and is implemented by, for example, the camera 102 in FIG. 3 and a program or the like that runs on the CPU 321 in FIG. 3.

The face image detection unit 515 is a unit to detect a face image from a captured image of a user captured by the imaging unit 514 and to extract characteristic information of the detected face image, and is implemented by, for example, a program that runs on the CPU 321 (or the CPU 311) in FIG. 3. Note that characteristic information of a face image includes, for example, information about a profile of the face, shapes and relative positions of parts such as eyes, nose, chin, cheekbone, and the like.

The image authentication unit 516 (an image authentication unit) is a unit to image-authenticate a user, based on the image captured by the imaging unit 514 and the user information registered in advance, and is implemented by, for example, a program that runs on the CPU 321 (or the CPU 311) in FIG. 3. The image authentication unit 516 executes, for example, face authentication of the user, based on the characteristic information about the face of the user extracted by the face image detection unit 515 from the image captured by the imaging unit 514, and the user information registered in advance.

The image authentication unit 516 permits image authentication of the user, for example, if characteristic information of a face extracted from a captured image of the user coincides with the characteristic information of the user stored in advance, or the characteristic information of the face extracted from the captured image of the user, having similarity over a threshold, is included in the characteristic information of the user stored in advance as above. Also, the image authentication unit 516 outputs (indicates) information for identifying the user permitted by the image authentication to the device authentication unit 517 or the like.

Note that the image authentication unit 516 in the embodiment may execute face authentication of a user, by using a publicly known face authentication technology (see, for example, Patent Document 1).

Further, the image authentication unit 516 may execute authentication of a user, by using various publicly known image authentication for user authentication (for example, fingerprint authentication, iris authentication, and vein authentication), based on characteristic information about living body parts of the user included in an image captured by the imaging unit 514.

The device authentication unit 517 (a device authentication unit) permits a user to use the image forming apparatus 101 if the user permitted by the wireless authentication by the wireless authentication unit 513 is the same user as the user permitted by the image authentication by the image authentication unit 516 (permits device authentication). The device authentication unit 517 is implemented by, for example, a program that runs on the CPU 321 (or the CPU 311) in FIG. 3.

For example, the device authentication unit 517 permits the user to use the image forming apparatus 101, if the identification information of the user authenticated for permission by the wireless authentication unit 513 is equivalent to the identification information of the user authenticated for permission by the image authentication unit 516.

Note that the identification information of the user obtained by the wireless authentication unit 513 may be considered to be equivalent to the identification information of the user obtained by the image authentication unit 516, not only if the two identification information items are completely equivalent to each other, but also if the two identification information items can be determined to be equivalent to each other substantially.

For example, if the identification information of the user output from the image authentication unit 516 is an eight-digit employee ID, and the identification information of the user output from the wireless authentication unit 513 is a ten-digit login ID having two digits added to the employee ID, the two identification information items may be determined to be equivalent to each other.

In this way, if the identification information output from the wireless authentication unit 513 and the identification information output from the image authentication unit 516 are identification information about the same user, the device authentication unit 517 may permit the user to use the image forming apparatus 101.

The user information management unit 518 is a unit to manage the user information 'a' 520 stored in the storage unit 519, and is implemented by, for example, a program that runs on the CPU 321 (or the CPU 311) in FIG. 3.

The storage unit 519 stores various information items, for example, the user information 'a' 520, and is implemented by, for example, the flash memory unit 324 and the RAM 323 in FIG. 3, and a program that runs on the CPU 321 in FIG. 3.

(User Information)

Here, an example of the user information will be described.

FIG. 7 is a table illustrating an example of the user information according to an embodiment.

The user information illustrated in FIG. 7 illustrates an example of user information 'a' 520 stored in the storage unit 519 of the operational unit 320, and user information 'A' 506 stored in the storage unit 505 of the main unit 310.

In the example in FIG. 7, the user information includes information about "user number", "name", "mail address", "login ID", "login password", "wireless tag ID", and "characteristic information of user".

The "user number" is an identification number specific to a data block for each user; for example, a serial number counted when registering information of users into the user information, and is an example of identification information specific to each user. The "user number" may be identification information of a user, for example, an employee ID.

The "name" is a name of the user. The "mail address" is a mail address of the user. The "login ID" and the "login password" are examples of authentication information for the user to log in the image forming apparatus 101.

The "wireless tag ID" is a tag ID (identification information) transmitted by the RFID tag 104 carried by the user, and represented by, for example, eight digits. Note that the "wireless tag ID" is an example of predetermined information transmitted from a wireless tag, and the predetermined information may include information other than digits, for example, the identification number and identification information of the user.

The "characteristic information of user" is characteristic information about the face of the user used for image authentication, for example, characteristic information about a profile of the face, shapes and relative positions of parts such as eyes, nose, chin, cheekbone, and the like, which are obtained and stored in advance. Note that the data format of the characteristic information of the users illustrated in FIG. 7 is just an example, and another format may be adopted discretionally.

The storage unit 519 of the operational unit 320 may store, for example, 300 to 1,800 records of the user information illustrated in FIG. 7. For example, the user information management unit 518 of the operational unit 320 stores at least a part of the user information 'A' 506 stored in the storage unit 505 of the main unit 310 as the user information 'a' 520 in the storage unit 519 of the operational unit 320. This makes it possible for the wireless authentication unit 513 and the image authentication unit 516 to read the user information 'a' 520 stored in the storage unit 519 of the operational unit 320 faster than to read the user information 'A' 506 stored in the storage unit 505 of the main unit 310.

<Flows of Processes>

Next, flows of processes of the authentication method by the image forming apparatus 101 and the information processing system 100 will be described.

(Process of Wireless Authentication)

Figure 8:
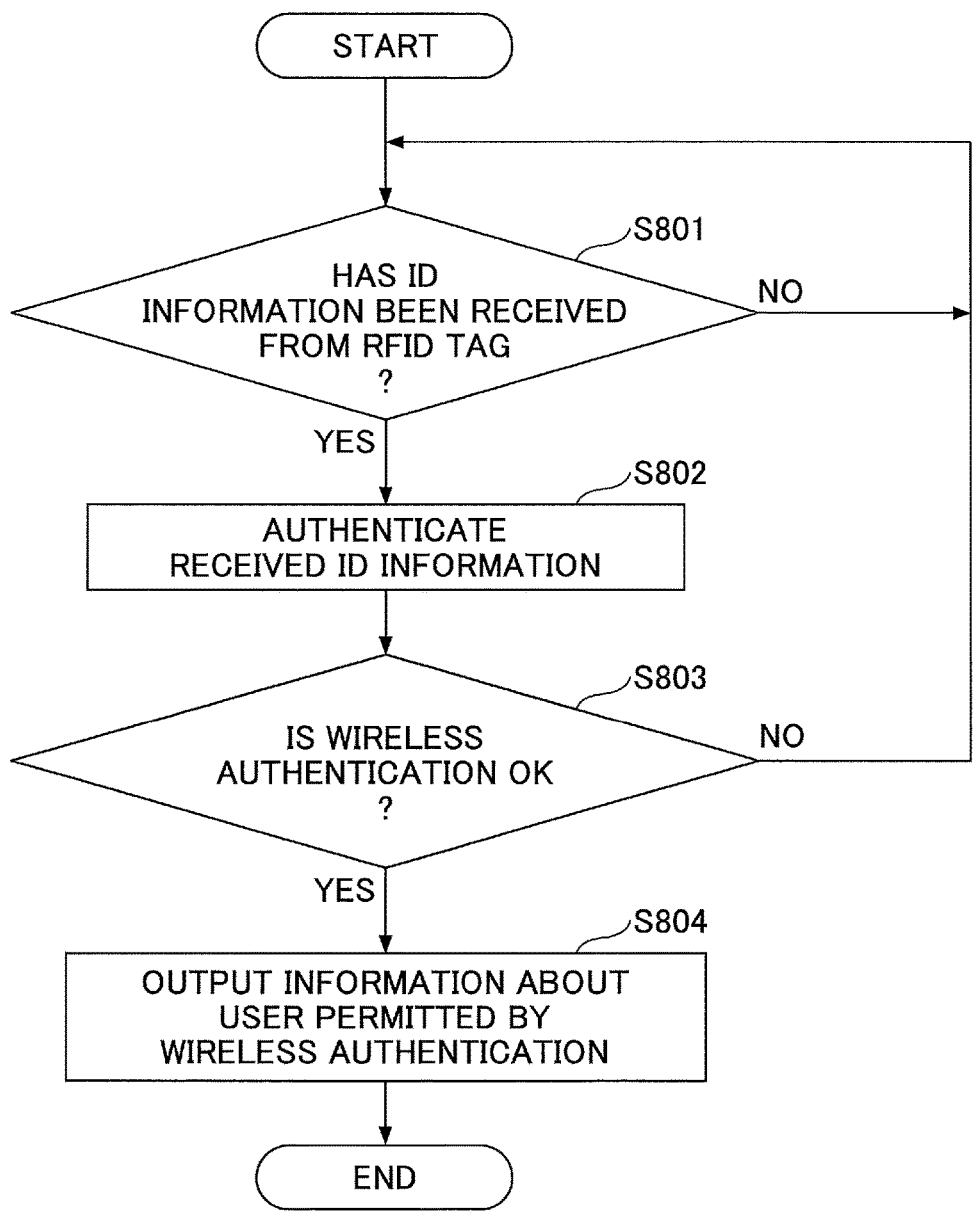
FIG. 8 is a flowchart illustrating an example of a process for wireless authentication according to an embodiment.

FIG. 8 is a flowchart illustrating an example of a process for wireless authentication according to an embodiment. Note that at a start time of the process for wireless authentication illustrated in FIG. 8, it is assumed that the wireless transmitter unit 511 has the RF tag reader 103 continuously transmit a radio wave to have the RFID tag 104 transmit predetermined information.

At Step S801, if the wireless receiver unit 512 receives identification information (a tag ID) from the RFID tag 104, the wireless authentication unit 513 executes Steps S802 and thereafter.

At Step S802, the wireless authentication unit 513 authenticates the identification information (the tag ID) received by the wireless communication unit 512. For example, the wireless authentication unit 513 permits wireless authentication of the user of the RFID tag 104 if the tag ID received by the wireless communication unit 512 is included in the "wireless tag IDs" in the user information as illustrated in FIG. 7. On the other hand, the wireless authentication unit 513 does not permit wireless authentication of the user of the RFID tag 104 if the tag ID received by the wireless communication unit 512 is not included in the "wireless tag IDs".

At Step S803, if not having permitted the received identification information for authentication (the result of authentication is not "OK"), the wireless authentication unit 513 makes the process go back to Step S801, to repeat the steps. On the other hand, if having permitted the received identification information for authentication (the result of authentication is "OK"), the wireless authentication unit 513 makes the process transition to Step S804.

After the process has transitioned to Step S804, the wireless authentication unit 513 outputs information for identifying the user (for example, the "user number" in the user information in FIG. 8) authenticated for permission (authentication was "OK") to the device authentication unit 517 or the like.

At this moment, the wireless authentication unit 513 may transmit information representing that permission has been obtained by the authentication (the result of the authentication being "OK"), along with the information for identifying the user authenticated for permission, to the device authentication unit 517.

Also, if the wireless authentication has not been permitted (rejected), the wireless authentication unit 513 may transmit information representing that rejection has been obtained by the authentication (the result of the authentication being "NG") to the device authentication unit 517.

(Process of Image Authentication Unit)

Figure 9:
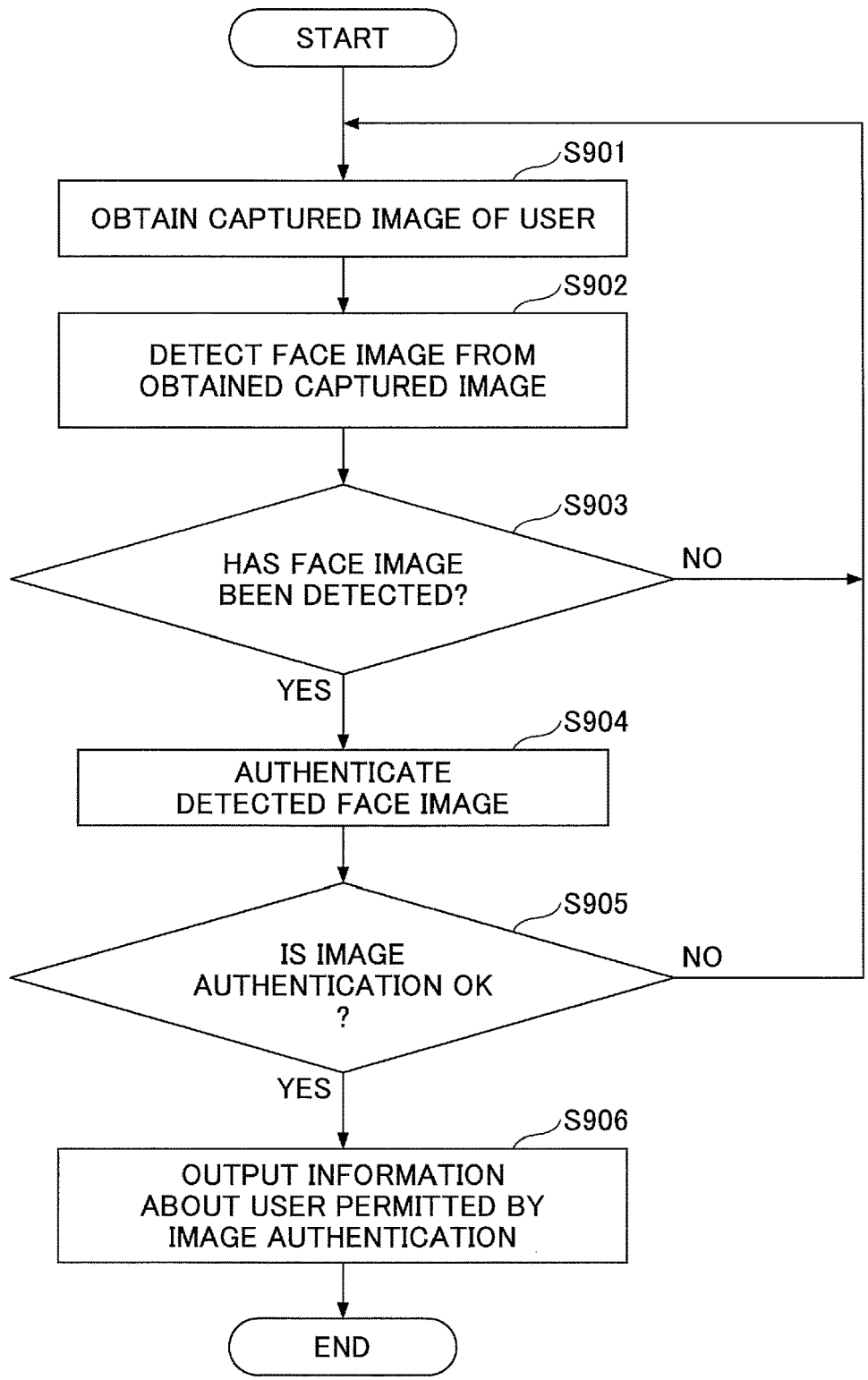
FIG. 9 is a flowchart illustrating an example of a process for image authentication according to an embodiment.

FIG. 9 is a flowchart illustrating an example of a process for image authentication according to an embodiment.

Figure 10A:
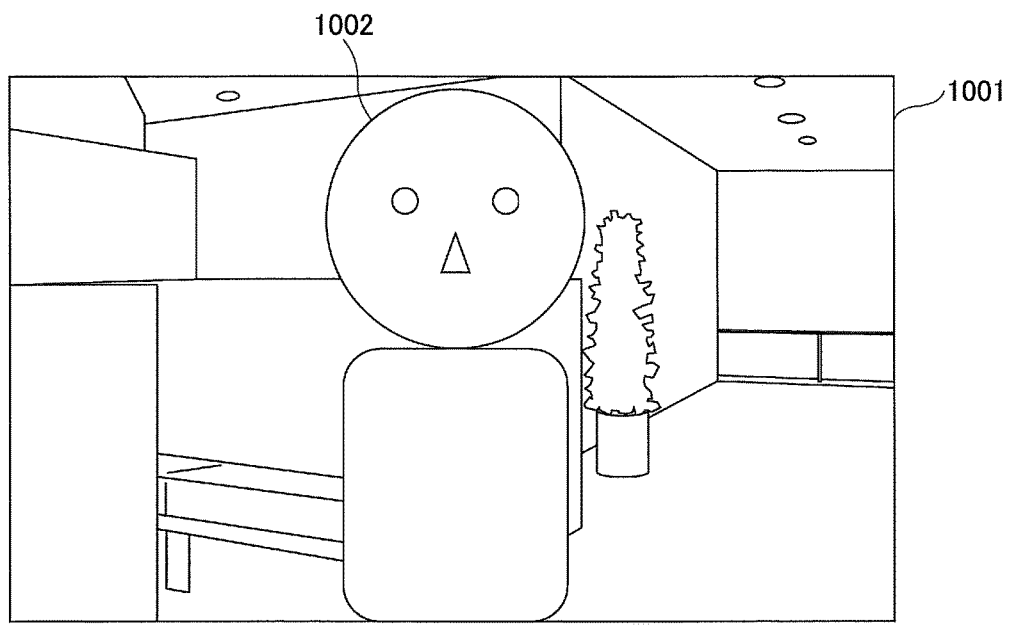
FIGS. 10A-10B are diagrams for describing an example of face authentication according to a first embodiment.

At Step S901, the imaging unit 514 obtains an image of the user by using the camera 102. FIG. 10A illustrates an example of an image obtained at this moment.

In the example illustrated in FIG. 10A, a captured image 1001 of the user includes the user 1002 in front of the image forming apparatus 101. In this way, the camera 102 is installed so that the image of the user 1002 in front of the image forming apparatus 101 can be captured to be included in the image 1001.

Figure 10B:
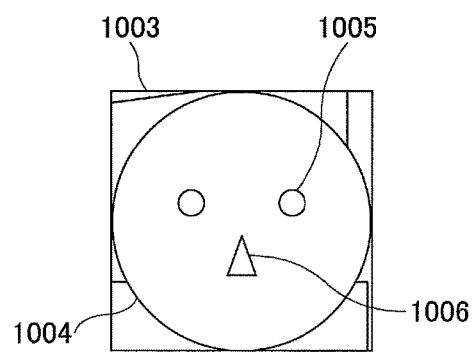

At Step S902, the face image detection unit 515 detects a face part image (a face image) in the captured image 1001 obtained at Step S901. FIG. 10B illustrates an example of a face image detected at this moment. The face image detection unit 515 extracts, for example, a profile of the face of the user 1004, and parts such as eyes 1005 and a nose 1006 from the captured image 1001 captured by the camera 102, and detects a face image 1003 of the user, for example, by using a publicly known pattern matching technology or the like. Also, if the face image 1003 has been detected, the face image detection unit 515 extracts characteristic information of the face of the user from the face image 1003.

At Step S903, the face image detection unit 515 makes the process branch off depending on whether a face image 1003 has been detected. If a face image 1003 has not been detected, the face image detection unit 515 makes the process go back to Step S901, to repeat the same steps. On the other hand, if a face image 1003 has been detected, the face image detection unit 515 makes the process go to Step S904.

Having transitioned to Step S904, the image authentication unit 516 executes face authentication of the user by using, for example, the characteristic information of the face of the user extracted by the face image detection unit 515 at Step S902, and the preregistered characteristic information of users. For example, the image authentication unit 516 permits the face authentication of the user if the characteristic information of the face of the user extracted by the face image detection unit 515 coincides with the preregistered characteristic information of the user, or has similarity over a threshold.

At Step S905, if not having permitted the user for image authentication (the result of authentication is not "OK"), the image authentication unit 516 makes the process go back to Step S901, to repeat the same steps. On the other hand, if having permitted the user for image authentication (the result of authentication is "OK"), the image authentication unit 516 makes the process transition to Step S906.

Having transitioned to Step S906, the image authentication unit 516 outputs information for identifying the user (for example, "user number" in user information in FIG. 8) who has been permitted by the image authentication (the image authentication is "OK") to the device authentication unit 517 or the like.

At this moment, along with the information for identifying the user permitted by the image authentication, the image authentication unit 516 may transmit information that represents the authentication has been permitted (the result of authentication is "OK") to the device authentication unit 517.

Also, if not having permitted the user for image authentication (rejected for the authentication), the image authentication unit 516 may transmit information that represents the authentication has been rejected (the result of authentication is "NG") to the device authentication unit 517.

(Process for Device Authentication)

Next, a process for device authentication by the image forming apparatus 101 and the information processing system 100 will be described.

First Embodiment (Process for Device Authentication by Image Forming Apparatus)

FIG. 11 is a flowchart illustrating an example of a process for device authentication according to the first embodiment. The process for device authentication illustrated in FIG. 11 illustrates an example of a process in which a user approaches the image forming apparatus 101 in the second power saving state, and eventually logs in the image forming apparatus 101.

At Step S1101, if approach of a person or an object to the image forming apparatus 101 is detected by the approach detection unit 501, the image forming apparatus 101 executes Steps S1102 and thereafter.

Having transitioned to Step S1102, the activation control unit 601 of the power state control unit 502 illustrated in FIG. 6 releases the power saving state of the image forming apparatus 101 to return to the normal state. Thus, for example, the power supply to the camera 102 and the RF tag reader 103 is resumed, and the camera 102 and the RF tag reader 103 are activated at Steps S1103 and S1105, respectively.

After having activated the camera 102 at Step S1103, at Step S1104, the image forming apparatus 101 executes a process for image authentication, for example, as illustrated in FIG. 9.

Here, it is assumed that if the user has been permitted by the image authentication, the image authentication unit 516 outputs information that represents the result of image authentication being "OK" and identification information of the user permitted by the image authentication (for example, the user number). It is also assumed that if the user has been permitted by the image authentication, the image authentication unit 516 outputs information that represents the result of image authentication being "NG".

Also, the image forming apparatus 101 executes Steps S1105 to S1107 in parallel with Steps S1103 and S1104.

For example, at Step S1105, the RF tag reader 103 is activated.

At Step S1106, the transmission control unit 602 of the image forming apparatus 101 has the RF tag reader 103 start transmitting a radio wave as the RF tag reader 103 has been activated by the activation control unit 601 due to the detection by the approach detection unit 501. For example, the transmission control unit 602 issues a request for transmitting a radio wave to the wireless transmitter unit 511 of the operational unit 320, to have the RF tag reader 103 start transmitting a radio wave.

At Step S1107, the image forming apparatus 101 executes a process for wireless authentication, for example, as illustrated in FIG. 8.

It is assumed here that if the user has been permitted by the wireless authentication, the wireless authentication unit 513 outputs information that represents the result of wireless authentication being "OK" and identification information of the user permitted by the wireless authentication (for example, the user number). It is also assumed that if the user has been rejected by the wireless authentication, the wireless authentication unit 513 outputs information that represents the result of image authentication being "NG".

At Step S1108, the device authentication unit 517 determines whether the result of wireless authentication of the user is "OK" (permitted), and the result of image authentication of the user is "OK" (permitted).

If at least one of the results is not "OK" (not permitted), the device authentication unit 517 makes the process transition to Steps S1104 and S1107, to execute the process for image authentication and the process for wireless authentication again. On the other hand, if both of the results are "OK" (permitted), the device authentication unit 517 makes the process transition to Step S1109.

Having transitioned to Step S1109, the device authentication unit 517 determines whether the user "OK'd" (permitted) by the wireless authentication is the same user as the user "OK'd" (permitted) by the image authentication. For example, the device authentication unit 517 determines whether the identification information (the user number, etc.) output from the wireless authentication unit 513 is equivalent to the identification information (the user number, etc.) output from the image authentication unit 516.

The device authentication unit 517 permits the user to log in the image forming apparatus 101 at Step 1110, for example, if the identification information output from the wireless authentication unit 513 is equivalent to the identification information output from the image authentication unit 516. Thus, the user can use the image forming apparatus 101.

On the other hand, for example, if the identification information output from the wireless authentication unit 513 is not equivalent to the identification information output from the image authentication unit 516, the device authentication unit 517 makes the process transition to Steps S1104 and S1107.

(Process for Controlling Power State of Information Processing System)

Next, an example of power control of the information processing system 100 and the image forming apparatus 101 will be further described in detail by using a sequence chart in FIG. 12.

Figure 13A:
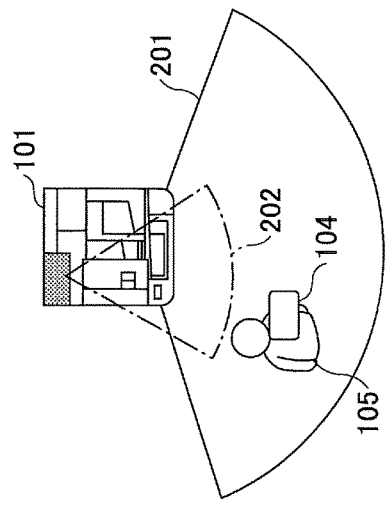
FIGS. 13A-13F are diagrams for describing detection operations of devices according to the first embodiment.

FIG. 12 is a sequence chart illustrating an example of a process for controlling the power state according to the first embodiment. At the start time in FIG. 12, it is assumed that the image forming apparatus 101 is in the second power saving state, and the approach detection unit 501 is about to detect a person or an object approaching the detection range 201 of the mobile object sensor 106, for example, as illustrated in FIG. 13A.

Figure 13B:
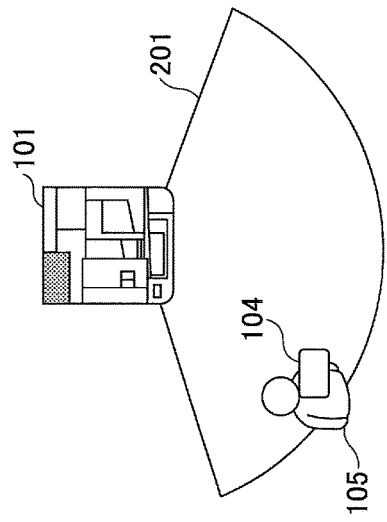

At Step S1201, the approach detection unit 501 detects approach of a person or an object. For example, if the user 105 has entered the detection range 201 of the mobile object sensor 106 as illustrated in FIG. 13B, the approach detection unit 501 determines that a person or an object has approached.

At Step S1202, the approach detection unit 501 issues an indication of the detected approach representing that a person or an object has approached, to the activation control unit 601.

At Step S1203, the activation control unit 601 activates the main unit 310 having been in the second power saving state.

At Step S1204, the activation control unit 601 makes a request for activation to the operational unit 320, for example, via the communication path 340. In this case, the activation control unit 601 may adopt any method for making a request for activation to the operational unit 320.

For example, the activation control unit 601 may transmit a predetermined command to the operational unit 320 via the communication path 340, or may activate the operational unit 320 by communicating via a predetermined control signal line, or supplying power.

Figure 13C:
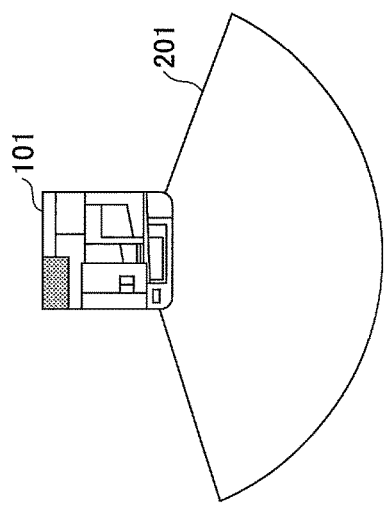

At Step S1205, the operational unit 320 is activated, and in turn, the camera 102 and the RF tag reader 103 are activated. Thus, the imaging unit 514 starts capturing the image of the detection range 202 of the camera 102, for example, as illustrated in FIG. 13C. Note that the RF tag reader 103 does not transmit a radio wave at this moment.

At Step S1206, the operational unit 320 issues a response to the activation request, representing that, for example, activation of the operational unit 320 has been started, or activation of the operational unit 320 has been completed, to the activation control unit 601 as the request source via the communication path 340.

At Step S1207, by using a captured image captured by the imaging unit 514, the operational unit 320 starts the process for image authentication, for example, as illustrated in FIG. 9.

At Step S1208, the activation control unit 601 issues an indication about activation representing that the main unit 310 has been activated due to the approach detected by the approach detection unit 501, to the power saving control unit 603.

At Step S1209, the power saving control unit 603 starts, for example, a timer T1 for transitioning to the first power saving state, and a timer T2 for transitioning to the second power saving state.

At Step S1210, the activation control unit 601 issues an indication about activation representing that the main unit 310 has been activated due to the approach detected by the approach detection unit 501, to the transmission control unit 602.

At Step S1211, the transmission control unit 602 acknowledges the indication about activation issued by the activation control unit 601, and at Step S1212, transmits a request for transmitting a radio wave to the wireless transmitter unit 511 of the operational unit 320 via the communication path 340.

Note that it is assumed in the following description of the embodiment that the cause of activation included in the indication about activation issued by the activation control unit 601 is "detected approach". A process for handling multiple causes of activation will be described in the second embodiment.

Figure 13D:
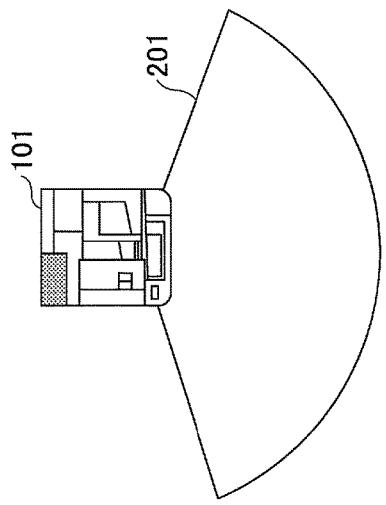

At Step S1213, the wireless transmitter unit 511 of the operational unit 320 starts transmitting a radio wave by the RF tag reader 103. Thus, the wireless receiver unit 512 becomes capable of receiving predetermined information (the tag ID or the like) from the RFID tag 104 located in the detection range 203 of the RF tag reader 103, for example, as illustrated in FIG. 13D. Thus, by using the predetermined information received by the wireless receiver unit 512, the operational unit 320 starts the process for wireless authentication, for example, as illustrated in FIG. 8.

At Step S1214, the wireless transmitter unit 511 of the operational unit 320 transmits, for example, a response representing that transmission of the radio wave has been started, to the transmission control unit 602 as the request source via the communication path 340.

Figure 14:
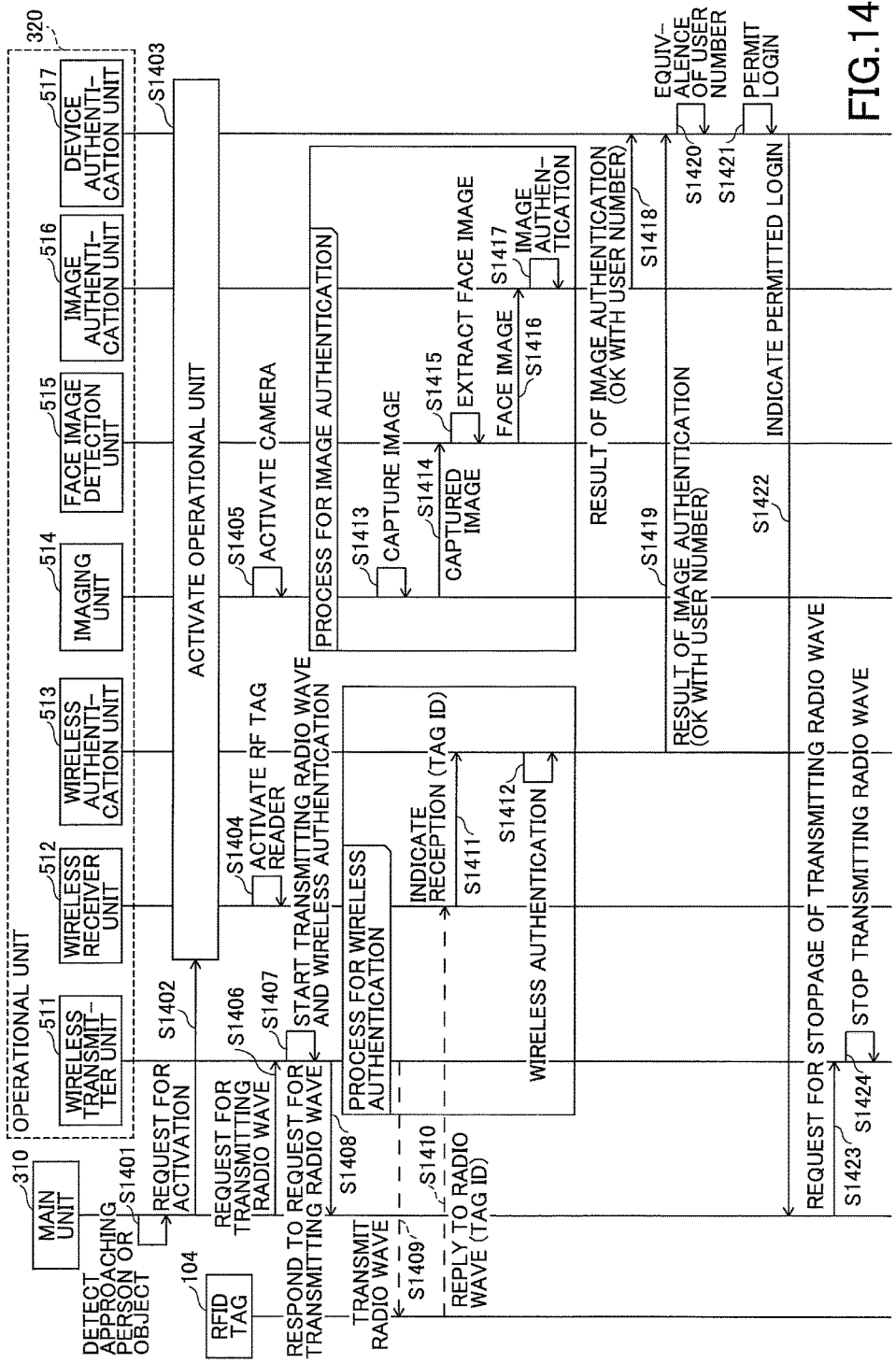
FIG. 14 is a sequence chart illustrating an example of an authentication process by an information processing system according to the first embodiment.

Note that authentication processes executed on the operational unit 320 hereafter will be separately described by using FIG. 14.

At Step S1215, when the timer T1 has timed out, the power saving control unit 603 has the image forming apparatus 101 transition to the first power saving state. Note that the time-out of the timer T1 is assumed to occur, for example, if the authentication does not complete even the time (T1) set in advance on the image forming apparatus 101 has passed, and no operation has been performed on the operational unit 320.

At Step S1215, the power saving control unit 603 indicates that the timer T1 has timed out to the transmission control unit 602.

At Step S1216, the transmission control unit 602 transmits a request for stopping the radio wave by the RF tag reader 103 to the wireless transmitter unit 511 of the operational unit 320 via the communication path 340.

Figure 13E:
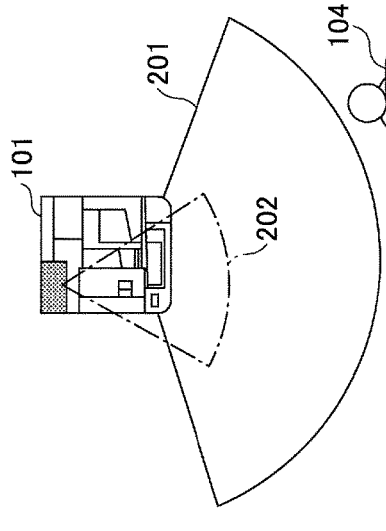

At Step S1218, the wireless transmitter unit 511 of the operational unit 320 stops transmitting the radio wave by the RF tag reader 103. Thus, the radio wave by the RF tag reader 103 is stopped, for example, as illustrated in FIG. 13E.

At Step S1219, when the timer T2 has timed out, the power saving control unit 603 has the image forming apparatus 101 transition to the second power saving state. Note that the time-out of the timer T2 is assumed to occur, for example, if the authentication does not complete even the time (T2) set in advance on the image forming apparatus 101 has passed, and no operation has been performed on the operational unit 320.

At Step S1220, the power saving control unit 603 indicates that the timer T2 has timed out to the activation control unit 601.

At Step S1221, the activation control unit 601 transmits a request for transitioning to the second power saving state to operational unit 320. This request for transitioning may be done by transmitting a predetermined command via the communication path 340 as done at Step S1204, communicating via a predetermined control signal line, or supplying power to stop the operational unit 320.

Figure 13F:
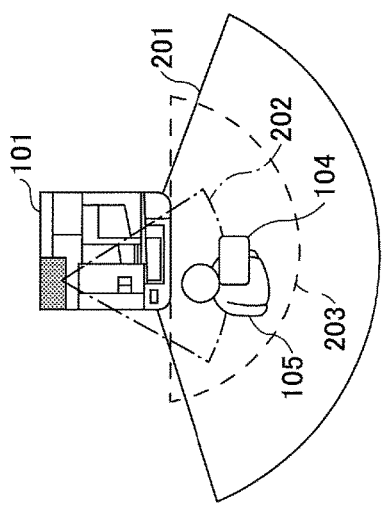

Thus, the image forming apparatus 101 transitions to the second power saving state in which the approach detection unit 501 keeps detecting a person or an object approaching the detection range 201 of the mobile object sensor 106, for example, as illustrated in FIG. 13F.

(Authentication Process by an Information Processing System)

FIG. 14 is a sequence chart illustrating an example of an authentication process by the information processing system 100 according to the first embodiment. This process is an example of a process mainly executed on the operational unit 320, corresponding to the process in FIG. 12. Here, an example of the authentication process will be described that is executed for the user 105 and the RFID tag 104, assuming that the wireless tag ID and the characteristic information of the user 105 have been registered in advance in the user information on the image forming apparatus 101.

At Step S1401, if the approach detection unit 501 of the main unit 310 detects approach of a person or an object, then at Step S1402, the activation control unit 601 of the main unit 310 makes a request for activation to the operational unit 320.

At Step S1403, the operational unit 320 is activated, and in turn, the RF tag reader 103 and the camera 102 are activated at Steps S1404 and S1405, respectively.

At Step S1403, the wireless transmitter unit 511 receives a request for transmitting a radio wave from the transmission control unit 602 of the main unit 310, and then at Step S1407, starts transmitting the radio wave by the RF tag reader 103. Also, at Step S1208, the wireless transmitter unit 511 transmits a response to the request for the radio wave transmission to the transmission control unit 602 of the main unit 310.

Thus, the operational unit 320 becomes ready to execute the process for wireless authentication including Steps S1409 to S1412.

For example, at Step S1409, the wireless transmitter unit 511 transmits the radio wave by the RF tag reader 103, and if the radio wave reaches the RFID tag 104 of the user 105, the RFID tag 104 replies with a radio wave including the tag ID at Step S1410.

At Step S1411, in response to receiving the radio wave from the RFID tag 104, the wireless receiver unit 512 of the operational unit 320 obtains the tag ID included in the received radio wave, and returns an indication about the reception including the obtained tag ID to the wireless authentication unit 513.

At Step S1412, the wireless authentication unit 513 executes wireless authentication of the tag ID indicated from the wireless receiver unit 512.

For example, the operational unit 320 executes the process for wireless authentication of Steps S1409 to S1412 repeatedly, and once the wireless authentication is permitted, indicates the result of wireless authentication representing that the wireless authentication has been permitted, to the device authentication unit 517 (Step S1419). The result of wireless authentication includes, for example, information representing permission by the wireless authentication (for example, "OK") and information for identifying the user (for example, the user number).

Note that the process for wireless authentication described above is substantially the same as, for example, the process for wireless authentication in FIG. 8, and the detailed description is omitted here.

Also, in parallel with this process for wireless authentication, the operational unit 320 executes the process for image authentication including Steps S1413 to S1417.

For example, at Step S1413, the imaging unit 514 captures an image by using the camera 102, and at Step S1414, indicates the captured image to the face image detection unit 515.

At Step S1415, the face image detection unit 515 extracts a face image, and at Step S1416, indicates the extracted face image to the image authentication unit 516.

At Step S1417, the image authentication unit 516 executes image authentication of the extracted face image.

For example, the operational unit 320 executes the process for image authentication of Steps S1413 to S1417 repeatedly, and once the image authentication is permitted, indicates the result of image authentication representing that the image authentication has been permitted to the device authentication unit 517 (Step S1418). The result of image authentication includes, for example, information representing permission by the image authentication (for example, "OK") and information for identifying the user (for example, the user number).

Note that the process for image authentication described above is substantially the same as, for example, the process for image authentication in FIG. 9, and the detailed description is omitted here.

At Step S1420, the device authentication unit 517 compares the user number included in the result of image authentication received at Step S1418, with the user number included in the result of wireless authentication received at Step S1419. Here, the authentication is done for the user 105 and the RFID tag 104 that have been preregistered, the two user numbers are equivalent to each other.

At Step S1421, the device authentication unit 517 issues an indication about permission for the user to log in, to the main unit 310.

At Step S1423, in response to the indication about the login permission, the transmission control unit 602 of the main unit 310 transmits a request for stopping the radio wave, to the wireless transmitter unit 511. This is to avoid executing next login authentication until the user who has been logged in the image forming apparatus 101 logs out. This makes it possible to reduce the power required for transmission of the radio wave by the RF tag reader 103.

At Step S1424, the wireless transmitter unit 511 stops transmitting the radio wave by the RF tag reader 103.

Another Example

Figure 15:
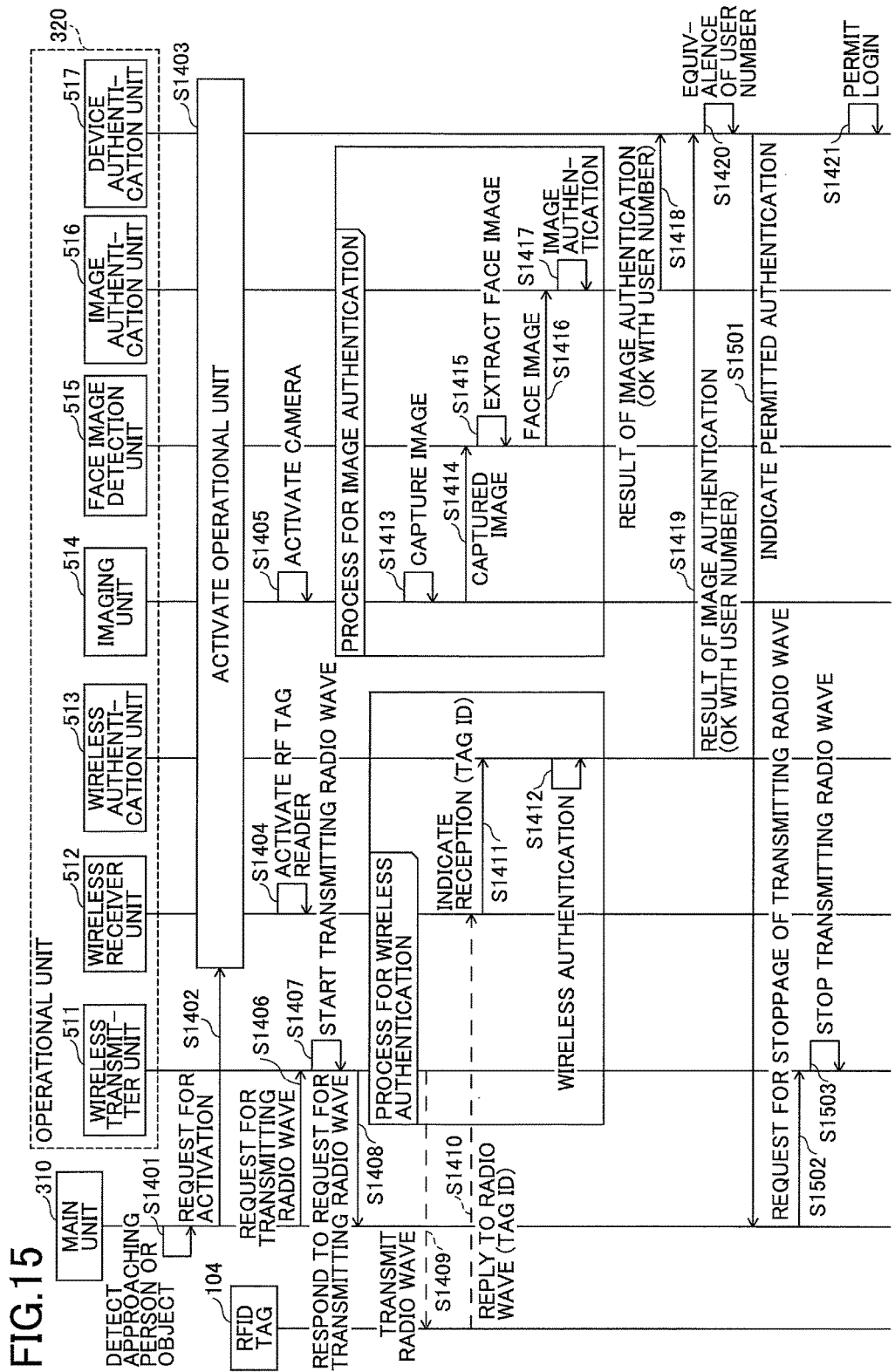
FIG. 15 is a sequence chart illustrating another example of an authentication process by an information processing system according to the first embodiment.

FIG. 15 is a sequence chart illustrating another example of an authentication process by the information processing system 100 according to the first embodiment. Note that since Steps S1401 to S1420 in FIG. 15 are the same as the corresponding steps illustrated in FIG. 14, different points from the process illustrated in FIG. 14 will be mainly described here.

If having determined that the two user numbers are equivalent to each other at Step S1420, the device authentication unit 517 transmits, at Step S1501, an indication representing that the user has been permitted for device authentication, to the transmission control unit 602 of the main unit 310.

At Step S1502, in response to receiving the indication about the permitted authentication, the transmission control unit 602 of the main unit 310 transmits a request for stopping the radio wave to the wireless transmitter unit 511.

At Step S1503, the wireless transmitter unit 511 stops transmitting the radio wave by the RF tag reader 103.

In this way, the image forming apparatus 101 may stop transmitting the radio wave by the RF tag reader 103 when the user number of the user permitted by the image authentication, is turned out to be equivalent to the user number of the user permitted by the wireless authentication, without waiting for completion of the login process of the user.

Also, permission for login at Step S1421 in FIG. 15 may be executed on the main unit 310 based on, for example, the indication about the permitted authentication at Step S1501.

Second Embodiment

The description in the first embodiment assumes that the cause of activation included in an indication about activation indicated from the activation control unit 601 is just "detected approach". In the second embodiment, an example with multiple causes of activation will be described.

(Process for Device Authentication by Image Forming Apparatus)

Figure 16:
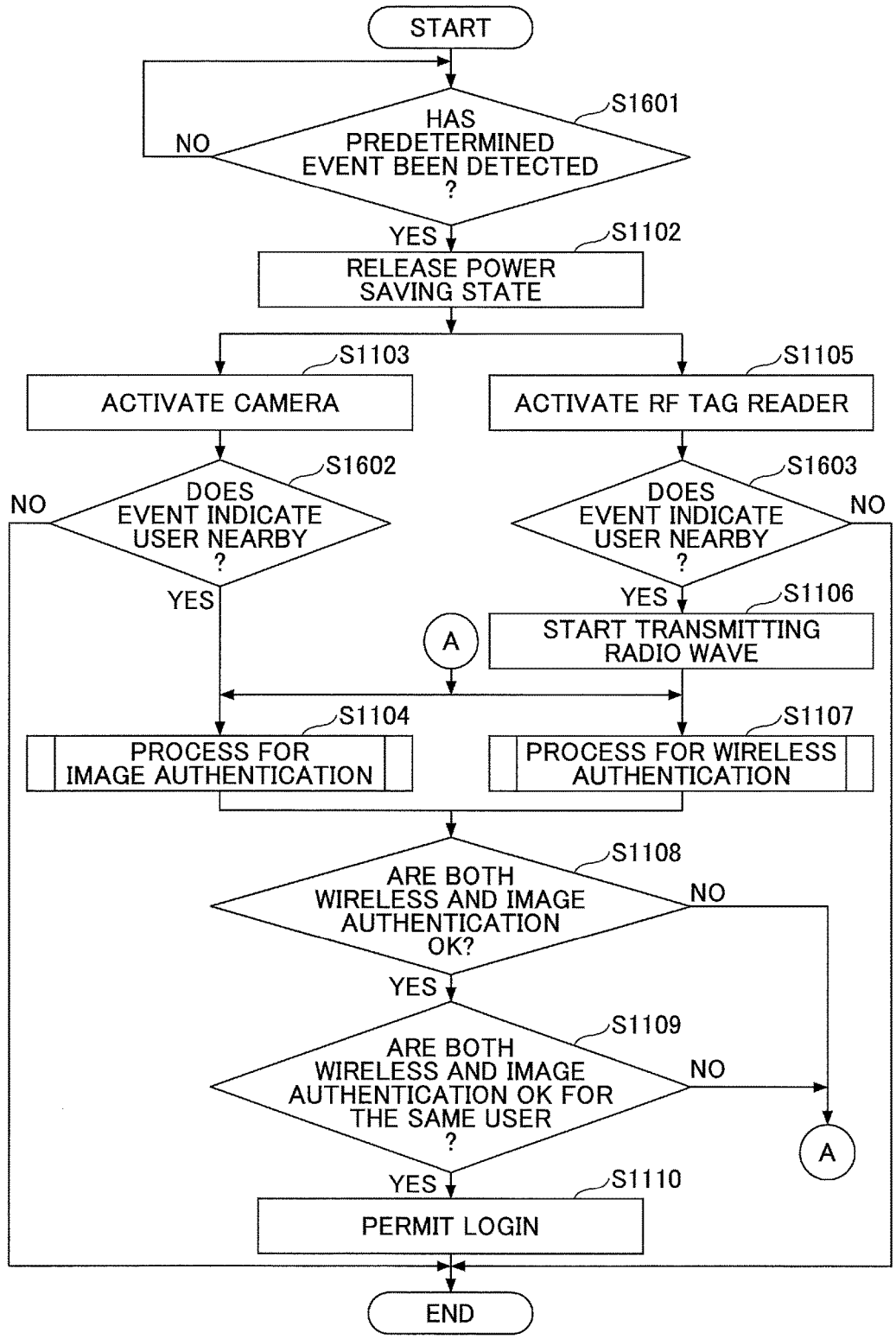
FIG. 16 is a flowchart illustrating an example of a process for device authentication according to a second embodiment.

FIG. 16 is a flowchart illustrating an example of a process for device authentication according to the second embodiment. Note that since Steps S1104, S1105, and S1106 to S1110 in FIG. 16 are the same as the corresponding steps illustrated in FIG. 11 in the first embodiment, different points from the process illustrated in FIG. 11 will be mainly described here.

If having detected a predetermined event at Step S1601, the image forming apparatus 101 executes Steps S1102 and thereafter. Here, it is assumed in the following description that the predetermined event is "detected approach" representing that a person or an object has approached detected by the approach detection unit 501, or "detected communication" representing that the communication unit 503 has detected communication. However, "detected approach" and "detected communication" are just examples of the predetermined event, which may be, for example, detection of a predetermined radio wave or a sound wave, an operation on the operational unit 320, a time set in advance, and the like.

Having transitioned to Step S1102, the activation control unit 601 of the power state control unit 502 releases the power saving state of the image forming apparatus 101 to return to the normal state. Thus, for example, the power supply to the camera 102 and the RF tag reader 103 is resumed, and the camera 102 and the RF tag reader 103 are activated at Steps S1103 and S1105, respectively.

After having activated the camera 102 at Step S1103, at Step S1602, the image authentication unit 516 and the like determines whether the predetermined event as the cause of activation is an event indicating existence of a person close to the image forming apparatus 101.

Assume here that if the predetermined event as the cause of activation is "detected approach", it is determined as an event indicating a user nearby. Also, assume that if the predetermined event as the cause of activation is "detected communication", the activation control unit 601 determines that it is not an event indicating a user nearby.

Also, as another example, the "event indicating a user nearby" may be, for example, detection of a predetermined radio wave or a sound wave, an operation on the operational unit 320, or the like described above. Also, an event other than the "event indicating a user nearby" may be, for example, a time set in advance or the like described above.

If the predetermined event as the cause of activation is an event indicating a person nearby (detected approach or the like), the image authentication unit 516 and the like executes the process for image authentication at Step S1104.

On the other hand, if the predetermined event as the cause of activation is not an event indicating a person nearby (detected communication or the like), the image authentication unit 516 and the like stops the process for image authentication at Step S1104, to end the process.

Similarly, after having activated the RF tag reader 103 at Step S1105, the transmission control unit 602 determines at Step S1603 whether the predetermined event as the cause of activation is an event indicating existence of a person close to the image forming apparatus 101.

If the predetermined event as the cause of activation is an event indicating a person nearby (detected approach or the like), the transmission control unit 602 starts transmitting the radio wave by the RF tag reader 103. For example, the transmission control unit 602 issues a request for transmitting a radio wave to the wireless transmitter unit 511 of the operational unit 320, to have the RF tag reader 103 start transmitting a radio wave, and at Step S1107, executes the process for wireless authentication.

On the other hand, if the predetermined event as the cause of activation is not an event indicating a person nearby (detected communication or the like), the transmission control unit 602 stops transmitting the radio wave by the RF tag reader 103, to end the process.

(Process for Controlling the Power State of Information Processing System)

Figure 17:
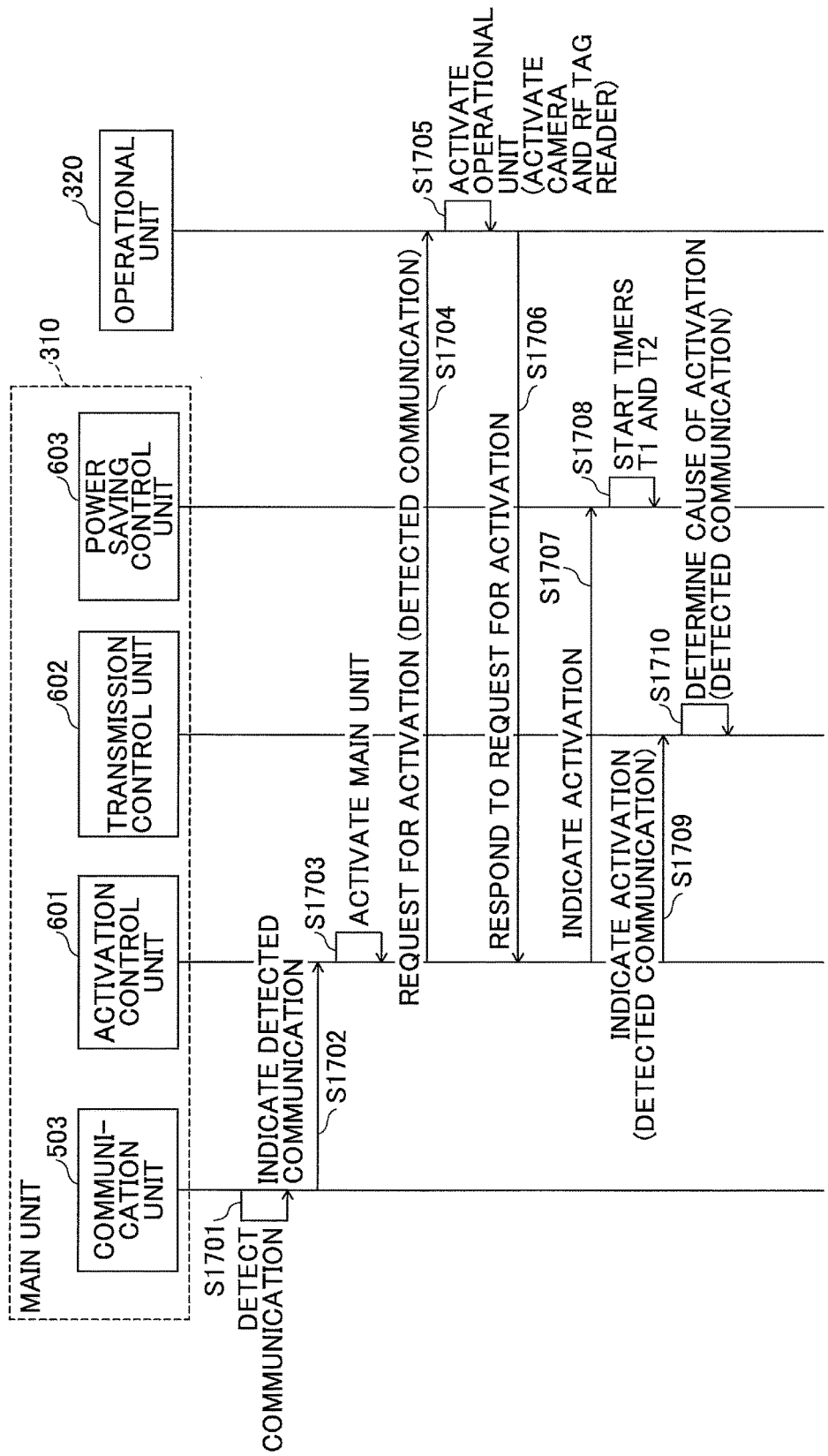
FIG. 17 is a sequence chart illustrating an example of a process for controlling the power state according to the second embodiment.

FIG. 17 is a sequence chart illustrating an example of a process for controlling the power state according to the second embodiment. The process illustrated in FIG. 17 illustrates an example of a case where the predetermined event is determined as "detected communication" at Step S1601 in FIG. 16. Note that if the predetermined event is determined as "detected approach" at Step S1601 in FIG. 16, substantially the same process as the process for controlling the power state according to the first embodiment illustrated in FIG. 12 is executed.

At Step 1701, the communication unit 503 detects communication, for example, from an external device connected via the network 350. For example, the communication unit 503 detects a print request, a scan request, a list obtainment request, or the like from an information terminal connected via the network 350.

At Step S1702, the communication unit 503 issues an indication about the detected communication representing that the communication has been detected, to the activation control unit 601.

At Step S1703, the activation control unit 601 activates the main unit 310 having been in the second power saving state, to transition to, for example, the normal state.

At Step S1704, the activation control unit 601 transmits, for example, a request for activation to the operational unit 320 via the communication path 340. This request for activation includes information that represents the cause of activation (here, "detected communication").

At Step S1705, the operational unit 320 is activated, and in turn, the camera 102 and the RF tag reader 103 are activated. At this moment, since the cause of activation is "detected communication", the image authentication unit 516 and the like of the operational unit 320 determines that it is not an event indicating a user nearby, and does not execute image authentication.

At Step S1706, the operational unit 320 issues a response to the activation request representing that, for example, activation of the operational unit 320 has been started, or activation of the operational unit 320 has been completed, to the activation control unit 601 as the request source via the communication path 340.

At Step S1707, the activation control unit 601 issues an indication about activation to the power saving control unit 603. At Step S1708, the power saving control unit 603 starts, for example, a timer T1 for transitioning to the first power saving state, and a timer T2 for transitioning to the second power saving state.

At Step S1709, the activation control unit 601 issues an indication about activation representing that the main unit 310 has been activated due to the detected communication detected by the communication unit 503.

At Step S1710, since the cause of activation included in the indication from the activation control unit 601 is "detected communication", the transmission control unit 602 determines that it is not an event indicating a user nearby, and does not execute control of transmission of the radio wave.

In this way, the image forming apparatus 101 according to the embodiment determines the cause of activation when returning to the normal state from the power saving state, and if the cause of activation is an event indicating a user nearby (for example, "detected approach"), executes the process for wireless authentication, the process for image authentication, and the process for device authentication.

On the other hand, if the cause of activation is not an event indicating a user nearby (for example, "detected communication"), the image forming apparatus 101 does not executes transmission of the radio wave by the RF tag reader 103, the process for wireless authentication, the process for image authentication, and the process for device authentication.

Thus, the image forming apparatus 101 can reduce the power consumption, for example, when activated in response to a request from an information terminal or the like connected via the network 350, by stopping transmission of the radio wave by the RF tag reader 103, the image authentication, and the wireless authentication.

Third Embodiment

The image forming apparatus 101 according to the second embodiment has the main unit 310 and the operational unit 320 return from the power saving state when a predetermined event has been detected, for example, at Step 1601 in FIG. 16. As another example, the image forming apparatus 101 may have the operational unit 320 return from the power saving state in response to a predetermined event.

Figure 18:
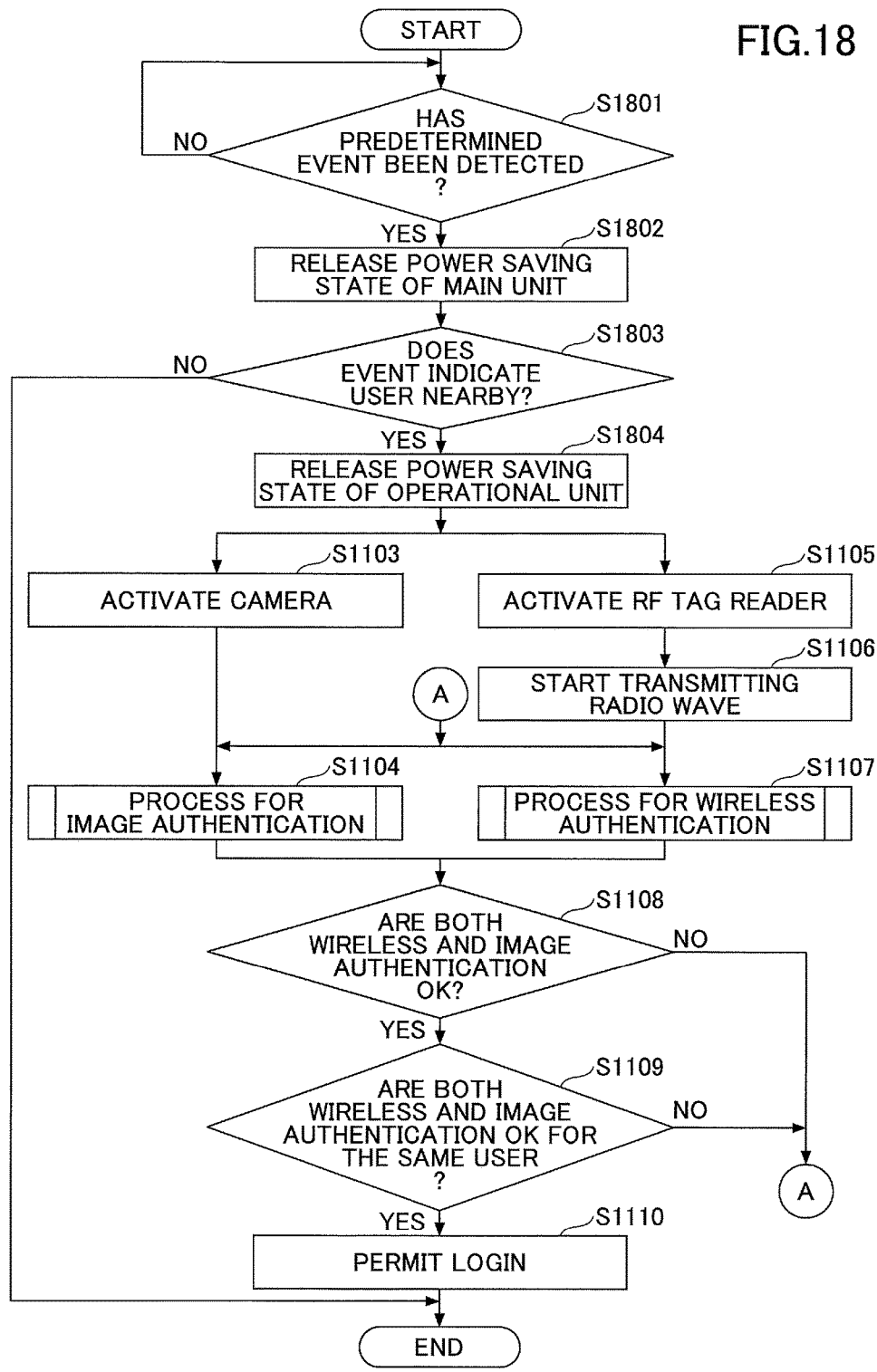
FIG. 18 is a flowchart illustrating an example of a process for device authentication according to a third embodiment.

FIG. 18 is a flowchart illustrating an example of a process for device authentication according to the third embodiment. Note that since Steps S1103 to S1110 in FIG. 18 are the same as the corresponding steps illustrated in FIG. 11 in the first embodiment, different points from the process in the first embodiment will be mainly described here.

If having detected a predetermined event at Step S1801, the image forming apparatus 101 executes Steps S1802 and thereafter. Here, as in the second embodiment, it is assumed in the following description that the predetermined event is "detected approach" representing that a person or an object has approached detected by the approach detection unit 501, or "detected communication" representing that the communication unit 503 has detected communication.

Having transitioned to Step S1802, the activation control unit 601 of the power state control unit 502 releases the power saving state of the main unit 310 of the image forming apparatus 101.

At Step S1803, the activation control unit 601 determines whether the predetermined event as the cause of activation is an event indicating existence of a person close to the image forming apparatus 101.

If the predetermined event as the cause of activation is an event indicating a person nearby (detected approach), the activation control unit 601 releases the power saving state of the operational unit 320 at Step S1804. Thus, the image forming apparatus 101 becomes ready to execute Steps S1103 and thereafter.

On the other hand, if the predetermined event as the cause of activation is not an event indicating a person nearby (detected communication), the activation control unit 601 ends the process.

By the process described above, for example, it is possible to prevent activation of the operational unit 320 if the user is not located close to the image forming apparatus 101, and to obtain the same effects as in the second embodiment.

Fourth Embodiment

In the fourth embodiment, a process will be described in which the transmission control unit 602 of the image forming apparatus 101 stops transmission of the radio wave by the RF tag reader 103.

In the process for controlling the power state according to the first embodiment illustrated in FIG. 12, transmission of the radio wave by the RF tag reader 103 is stopped at Step S1217 if the authentication process does not complete in the predetermined time and no operation has been done on the operational unit 320. However, this is just an example; as another example, the transmission control unit 602 may stop transmission of the radio wave by the RF tag reader 103 if the image forming apparatus 101 transitions to a predetermined power saving state as in a process illustrated in FIG. 19A.

Figure 19A:
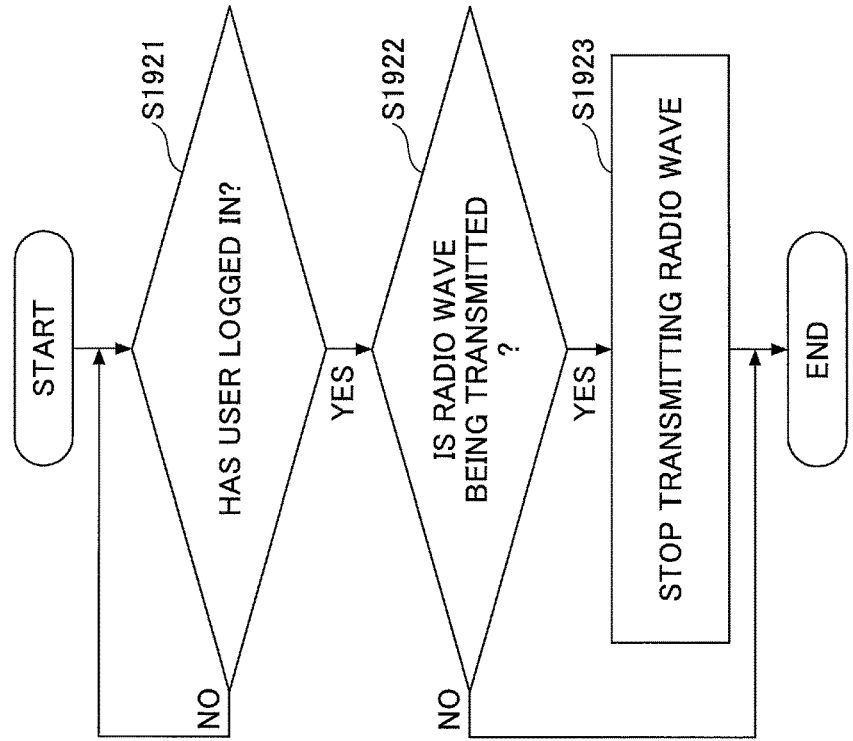
FIGS. 19A-19B are flowcharts illustrating an example of a process for stopping radio wave transmission according to a fourth embodiment.

FIG. 19A illustrates an example of a process for stopping radio wave transmission by the transmission control unit 602.

Having determined that the image forming apparatus 101 has transitioned to a predetermined power saving state at Step S1911, the transmission control unit 602 of the image forming apparatus 101 executes Steps S1912 and thereafter.

Note that the predetermined power saving state is not limited to the first power saving state and the second power saving state described above, but may be, for example, a state in which the operational unit 320 reduces the brightness of the display screen, or turns off (changes) the display screen. Also, transitioning to the power saving state is not limited to be done upon the time-out of a timer, but may be done, for example, in response to an operation by the user (for example, pressing the power saving button).

At Step S1912, the transmission control unit 602 determines whether the wireless transmitter unit 511 is transmitting the radio wave by the RF tag reader 103.

If the wireless transmitter unit 511 is transmitting the radio wave by the RF tag reader 103, at Step S1913, the transmission control unit 602 has the wireless transmitter unit 511 stop transmission of the radio wave. On the other hand, if the wireless transmitter unit 511 is not transmitting the radio wave by the RF tag reader 103, the transmission control unit 602 ends the process.

In this way, the transmission control unit 602 may stop transmission of the radio wave by the RF tag reader 103 when the image forming apparatus 101 has transitioned to a predetermined power saving state in which the power consumption is lower than in the previous state.

Also, in the authentication process according to the first embodiment illustrated in FIG. 14, a login is permitted if the information for identifying the user permitted by the wireless authentication has turned to be equivalent to the information for identifying the user permitted by the image authentication, and then, the RF tag reader 103 stops transmitting the radio wave. However, this is just an example; the image forming apparatus 101 may stop transmission of the radio wave by the RF tag reader 103 when, for example, the user logs in the image forming apparatus 101 by another method, such as inputting the account information.

Figure 19B:
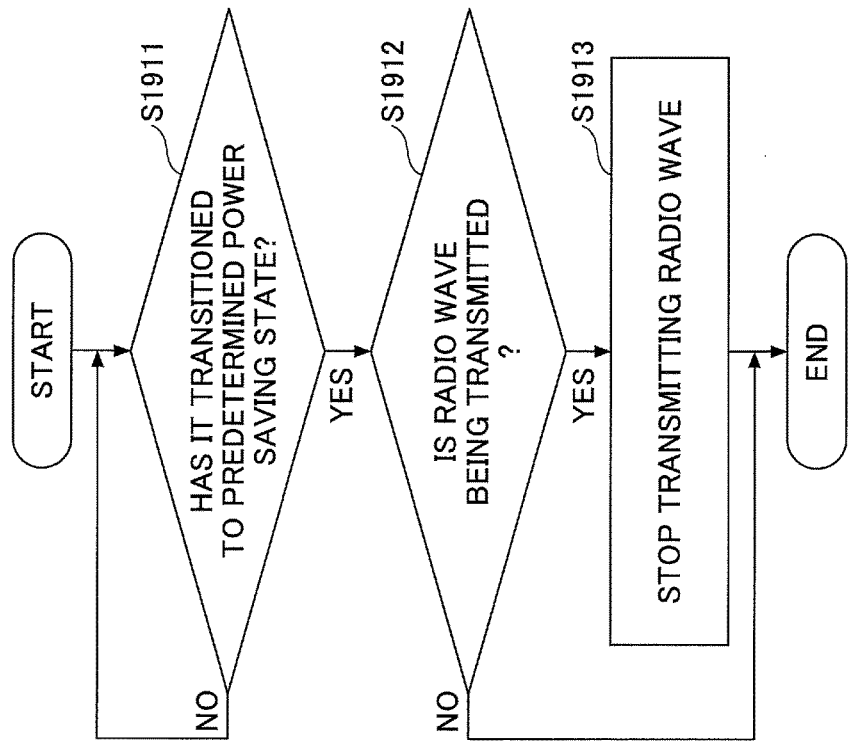

FIG. 19B illustrates another example of a process for stopping radio wave transmission by the transmission control unit 602.

Having determined that the user has logged in the image forming apparatus 101 at Step S1912, the transmission control unit 602 of the image forming apparatus 101 executes Steps S1922 and thereafter.

At Step S1922, the transmission control unit 602 determines whether the wireless transmitter unit 511 is transmitting the radio wave by the RF tag reader 103.

If the wireless transmitter unit 511 is transmitting the radio wave by the RF tag reader 103, at Step S1913, the transmission control unit 602 has the wireless transmitter unit 511 stop transmission of the radio wave. On the other hand, if the wireless transmitter unit 511 is not transmitting the radio wave by the RF tag reader 103, the transmission control unit 602 ends the process.

In this way, the transmission control unit 602 may stop transmission of the radio wave by the RF tag reader 103 when the user has logged in the image forming apparatus 101 by any login method.

[Supplementary Description of Embodiments]

Functions of the units of the image forming apparatus 101 according to the above embodiments are implemented by having the CPU 311 or the CPU 321 run a program stored in the storage device (for example, the storage unit 314, the flash memory unit 324, the ROM 312, and the ROM 322). However, the implementation is not limited as such; at least a part of the functions of the units of the above image forming apparatus 101 may be implemented by, a dedicated hardware circuit (for example, a semiconductor integrated circuit).

Also, although the main unit 310 and the operational unit 320 independently operate on different operating systems in the above embodiments, the main unit 310 and the operational unit 320 are not limited as such; for example, the main unit 310 and the operational unit 320 may operate on the same operating system.

Also, the program executed by the image forming apparatus 101 in the above embodiments may be configured to be recorded on a computer-readable recording medium, such as various optical disks, magnetic media, and USB memories, to be provided as a file in an installable format or an executable format. Alternatively, the program executed by the image forming apparatus 101 in the above embodiments may be configured to be provided or distributed via a network such as the Internet. Also, the program may be configured to be installed in advance on a non-volatile recording medium such as a ROM, to be provided.

CONCLUSION

According to an embodiment, an information processing apparatus (101) configured to authenticate a user (105), by using a wireless device (103) configured to obtain predetermined information from a wireless terminal (104) carried by the user (105), and an imaging device (102) configured to capture an image of the user (105), includes: an approach detection unit (501) configured to detect an approach of a person or an object; an activation control unit (601) configured to activate the wireless device (103) and the imaging device (102) in response to detection of the approach by the approach detection unit (501); a transmission control unit (602) configured to transmit a radio wave for having the wireless terminal (104) transmit the predetermined information when the wireless device (103) has been activated in response to the detection of the approach by the approach detection unit (501); a wireless authentication unit (513) configured to execute wireless authentication of the user (105), based on the predetermined information obtained by the wireless device (103) from the wireless terminal (104); an image authentication unit (516) configured to execute image authentication of the user (105), based on the image of the user (105) captured by the imaging device (102); and a device authentication unit (517) configured to permit the user (105) to use the information processing apparatus (101) in a case where the user permitted by the wireless authentication is the same user as the user permitted by the image authentication.

Configured as described above, the information processing apparatus (101) that authenticates a user by using image authentication and wireless authentication can shorten the time required for authentication on the apparatus (101) while preventing increase of the power consumption of the apparatus (101).

Note that reference codes in the above parentheses are attached to make the description understandable and just examples, not intended to limit the scope of the present invention.

RELATED-ART DOCUMENTS

Patent Documents

[Patent Document 1] Japanese Laid-open Patent Publication No. 2015-35178

The present application claims priority under 35 U.S.C. § 119 of Japanese Patent Application No. 2016-050597 filed on Mar. 15, 2016, the entire contents of which are hereby incorporated by reference.

What is claimed is:

1. An information processing apparatus configured to authenticate a user, by using a wireless device configured to obtain predetermined information from a wireless terminal carried by the user, and an imaging device configured to capture an image of the user, the information processing apparatus comprising:
   a hardware memory; and
   a hardware processor that is coupled to the memory and that is configured to
   detect an approach of the user or an object;
   activate the wireless device and the imaging device in response to detection of the approach;
   transmit a radio wave for having the wireless terminal transmit the predetermined information when the wireless device has been activated in response to the detection of the approach;
   execute wireless authentication of the user, based on the predetermined information obtained by the wireless device from the wireless terminal;
   execute image authentication of the user, based on the image of the user captured by the imaging device;
   permit the user to use the information processing apparatus in a case where the user permitted by the wireless authentication is the same user as the user permitted by the image authentication, and
   execute communication with an external apparatus via a network,
   wherein the processor activates the wireless device and the imaging device in response to detection of the communication,
   wherein the processor has the wireless device stop transmitting the radio wave in a case where the processor has activated the wireless device in response to the detection of the communication, and
   wherein the processor stops the image authentication in a case where the processor has activated the imaging device in response to the communication.

2. The information processing apparatus as claimed in claim 1, wherein the processor has the wireless device stop transmitting the radio wave in a case where the processor has permitted the user to use the information processing apparatus.

3. The information processing apparatus as claimed in claim 1, wherein the processor has the wireless device stop transmitting the radio wave in a case where the user permitted by the wireless authentication is the same user as the user permitted by the image authentication.

4. The information processing apparatus as claimed in claim 1, wherein the information processing apparatus includes
   a normal state in which the information processing apparatus can execute a normal process,
   a first power saving state in which the wireless device is activated, and power consumption is less than in the normal state, a second power saving state in which the wireless device is stopped, and power consumption is less than in the first power saving state, wherein the processor has the wireless device stop transmitting the radio wave when the information processing apparatus transitions to the first power saving state from the normal state.

5. The information processing apparatus as claimed in claim 4, wherein the processor is further configured to have the information processing apparatus transition to the first power saving state or the second power saving state, in a case where use of the information processing apparatus is not permitted by the processor and no operation has been performed within a time set in advance after the wireless device and the imaging device have been activated.

6. The information processing apparatus as claimed in claim 1, wherein the information processing apparatus changes brightness of a display screen of the information processing apparatus in a case where no operation has been performed on the information processing apparatus for a predetermined time or longer, wherein processor has the wireless device stop transmitting the radio wave in a case where the information processing apparatus has changed the brightness of the display screen.

7. The information processing apparatus as claimed in claim 1, wherein the processor executes control for activating the wireless device and the imaging device in response to receiving the detection of the approach, wherein the processor stops the control for activating the wireless device and the imaging device in response to receiving the detection of the communication.

8. The information processing apparatus as claimed in claim 1, wherein the processor is a mobile object sensor configured to detect a mobile object within a predetermined range.

9. The information processing apparatus as claimed in claim 8, wherein the mobile object sensor is a pyroelectricity sensor.

10. The information processing apparatus as claimed in claim 1, wherein the wireless terminal is an RFID tag, wherein the predetermined information is identification information of the RFID tag.

11. The information processing apparatus as claimed in claim 10, wherein the RFID tag is a passive tag, wherein the wireless device transmits the radio wave to have the passive tag transmit the identification information of the passive tag.

12. The information processing apparatus as claimed in claim 1, wherein the information processing apparatus is an image forming apparatus.

13. A method for authentication executed by an information processing apparatus configured to authenticate a user, by using a wireless device configured to obtain predetermined information from a wireless terminal carried by the user, and an imaging device configured to capture an image of the user, the method comprising:

detecting an approach of the user or an object;

activating the wireless device and the imaging device in response to detection of the approach;

transmitting a radio wave for having the wireless terminal transmit the predetermined information when the wireless device has been activated in response to the detection of the approach;

executing wireless authentication of the user, based on the predetermined information obtained by the wireless device from the wireless terminal;

executing image authentication of the user, based on the image of the user captured by the imaging device;

permitting the user to use the information processing apparatus in a case where the user permitted by the wireless authentication is the same user as the user permitted by the image authentication;

executing communication with an external apparatus via a network;

activating the wireless device and the imaging device in response to detection of the communication;

having the wireless device stop transmitting the radio wave in a case of having activated the wireless device in response to the detection of the communication; and stopping the image authentication in a case of having activated the imaging device in response to the communication.

14. An information processing system, comprising:

a wireless device configured to obtain predetermined information from a wireless terminal carried by a user;

an imaging device configured to capture an image of the user; and an information processing apparatus configured to authenticate the user by using the wireless device and the imaging device, wherein the information processing apparatus includes a hardware memory; and a hardware processor that is coupled to the memory and that is configured to detect an approach of the user or an object, activate the wireless device and the imaging device in response to detection of the approach, transmit a radio wave for having the wireless terminal transmit the predetermined information when the wireless device has been activated in response to the detection of the approach, execute wireless authentication of the user, based on the predetermined information obtained by the wireless device from the wireless terminal, execute image authentication of the user, based on the image of the user captured by the imaging device, permit the user to use the information processing apparatus in a case where the user permitted by the wireless authentication is the same user as the user permitted by the image authentication, and execute communication with an external apparatus via a network, wherein the processor activates the wireless device and the imaging device in response to detection of the communication, wherein the processor has the wireless device stop transmitting the radio wave in a case where the processor has activated the wireless device in response to the detection of the communication, and wherein the processor stops the image authentication in a case where the processor has activated the imaging device in response to the communication.

* * * * *